(12) United States Patent
Hassan et al.

(10) Patent No.: US 11,133,962 B2
(45) Date of Patent: Sep. 28, 2021

(54) DEVICE SYNCHRONIZATION WITH NOISE SYMBOLS AND PATTERN RECOGNITION

(71) Applicant: Microsoft Technology Licensing, LLC, Redmond, WA (US)

(72) Inventors: Amer Aref Hassan, Kirkland, WA (US); Wei-Chen Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 58 days.

(21) Appl. No.: 16/531,041

(22) Filed: Aug. 3, 2019

(65) Prior Publication Data

US 2021/0036898 A1 Feb. 4, 2021

(51) Int. Cl.
*H04L 25/03* (2006.01)
*H04L 12/28* (2006.01)
*H04L 25/08* (2006.01)

(52) U.S. Cl.
CPC .... *H04L 25/03019* (2013.01); *H04L 12/2827* (2013.01); *H04L 25/085* (2013.01)

(58) Field of Classification Search
CPC .......... H04L 25/03019; H04L 12/2827; H04L 25/085
See application file for complete search history.

(56) References Cited

U.S. PATENT DOCUMENTS

| | | |
|---|---|---|
| 5,815,665 A | 9/1998 | Teper et al. |
| 6,079,021 A | 6/2000 | Abadi et al. |
| 6,954,862 B2 | 10/2005 | Serpa |
| 7,215,727 B2 * | 5/2007 | Yousef ................. H04B 1/1027 375/222 |
| 7,451,322 B2 | 11/2008 | Lee |
| 7,552,467 B2 | 6/2009 | Lindsay |
| 7,581,113 B2 | 8/2009 | Smith et al. |
| 7,600,128 B2 | 10/2009 | Pritchard et al. |
| 7,653,818 B2 | 1/2010 | Serpa |
| 8,140,854 B2 | 3/2012 | Ogawa |
| 8,578,476 B2 | 11/2013 | Sama |

(Continued)

FOREIGN PATENT DOCUMENTS

| | | |
|---|---|---|
| CN | 101197095 A | 6/2008 |
| FR | 2862144 A1 | 5/2005 |

(Continued)

OTHER PUBLICATIONS

Alsaiari, Hussain S., "Graphical One-Time Password Authentication", In Thesis of Plymouth University, May, 2016, 460 Pages.

(Continued)

*Primary Examiner* — Siming Liu
(74) *Attorney, Agent, or Firm* — Schwegman Lundberg & Woessner, P.A.

(57) ABSTRACT

Disclosed in some examples are methods, systems and machine-readable mediums which allow for more secure and robust synchronization by implementing synchronization systems with sequences that may include interspersed noise symbols. These systems, which still synchronize despite one or more noise symbols N in indeterminate positions that are not known by the recipient device during a synchronization attempt reduce the amount of failed synchronization attempts.

20 Claims, 13 Drawing Sheets

(56) References Cited

U.S. PATENT DOCUMENTS

| | | |
|---|---|---|
| 8,667,280 B2 | 3/2014 | Sama |
| 8,918,836 B2 | 12/2014 | Schechter et al. |
| 9,172,697 B1 | 10/2015 | Holtz |
| 9,237,150 B2 | 1/2016 | Yun et al. |
| 9,524,395 B2 | 12/2016 | Selander et al. |
| 9,536,067 B1 | 1/2017 | Lee |
| 9,600,658 B2 | 3/2017 | Kanzaki et al. |
| 9,606,983 B1 | 3/2017 | McClintock et al. |
| 9,626,506 B1 | 4/2017 | Shetty et al. |
| 9,632,603 B2 | 4/2017 | Fang et al. |
| 9,722,966 B2 | 8/2017 | Pandya et al. |
| 9,722,996 B1 | 8/2017 | Kolman et al. |
| 9,946,867 B1 | 4/2018 | Ramalingam et al. |
| 10,091,188 B2 | 10/2018 | Xiao et al. |
| 10,284,547 B2 | 5/2019 | Holtz |
| 10,812,482 B1 | 10/2020 | Xu et al. |
| 10,866,699 B1 | 12/2020 | Hassan et al. |
| 2002/0029341 A1 | 3/2002 | Juels et al. |
| 2002/0108046 A1 | 8/2002 | Armingaud |
| 2002/0144158 A1 | 10/2002 | Hekimian |
| 2003/0078949 A1 | 4/2003 | Scholz et al. |
| 2003/0172281 A1 | 9/2003 | Lee |
| 2005/0273625 A1 | 12/2005 | Dayan et al. |
| 2006/0294392 A1 | 12/2006 | Veprek et al. |
| 2008/0066167 A1 | 3/2008 | Andri |
| 2008/0320310 A1 | 12/2008 | Florencio et al. |
| 2009/0064278 A1 | 3/2009 | Harris |
| 2009/0282062 A1 | 11/2009 | Husic |
| 2010/0057709 A1 | 3/2010 | Kawanaka et al. |
| 2011/0271118 A1 | 11/2011 | Mahmoud et al. |
| 2012/0304302 A1 | 11/2012 | Stecher |
| 2013/0061298 A1 | 3/2013 | Longobardi et al. |
| 2013/0238903 A1 | 9/2013 | Mizunuma |
| 2013/0254875 A1 | 9/2013 | Sama |
| 2013/0283337 A1 | 10/2013 | Schechter et al. |
| 2013/0333007 A1 | 12/2013 | Chougle et al. |
| 2014/0101744 A1 | 4/2014 | Liu et al. |
| 2014/0165169 A1 | 6/2014 | Buck et al. |
| 2014/0165175 A1 | 6/2014 | Sugiyama |
| 2014/0223189 A1 | 8/2014 | Gao et al. |
| 2014/0281506 A1 | 9/2014 | Redberg et al. |
| 2014/0310805 A1 | 10/2014 | Kandekar |
| 2014/0317705 A1 | 10/2014 | Eluard et al. |
| 2014/0365782 A1 | 12/2014 | Beatsori et al. |
| 2014/0373088 A1 | 12/2014 | Aggarwal et al. |
| 2015/0294109 A1 | 10/2015 | Kanzaki et al. |
| 2015/0312040 A1 | 10/2015 | Zheng |
| 2015/0324579 A1 | 11/2015 | Qian et al. |
| 2015/0363593 A1 | 12/2015 | Joye et al. |
| 2016/0021094 A1 | 1/2016 | Dong et al. |
| 2016/0050209 A1 | 2/2016 | Govande et al. |
| 2016/0078216 A1 | 3/2016 | Chougle et al. |
| 2016/0125182 A1 | 5/2016 | Miura et al. |
| 2017/0185806 A1 | 6/2017 | Kong et al. |
| 2017/0207909 A1 | 7/2017 | Whatmough et al. |
| 2017/0208091 A1 | 7/2017 | Whitsell et al. |
| 2017/0272100 A1 | 9/2017 | Yanovsky et al. |
| 2017/0373858 A1 | 12/2017 | Mandal et al. |
| 2018/0191702 A1 | 7/2018 | Padmanabhan et al. |
| 2018/0278421 A1 | 9/2018 | Karabina et al. |
| 2019/0080060 A1 | 3/2019 | Lee |
| 2019/0141022 A1 | 5/2019 | Reeve et al. |
| 2019/0272370 A1 | 9/2019 | Hassan et al. |
| 2020/0137038 A1 | 4/2020 | Endler |
| 2020/0387592 A1 | 12/2020 | Hassan et al. |
| 2020/0389441 A1 | 12/2020 | Hassan et al. |
| 2020/0389442 A1 | 12/2020 | Hassan |
| 2020/0389443 A1 | 12/2020 | Hassan et al. |
| 2020/0389444 A1 | 12/2020 | Hassan et al. |
| 2020/0389445 A1 | 12/2020 | Hassan et al. |
| 2020/0389446 A1 | 12/2020 | Hassan et al. |
| 2021/0021420 A1 | 1/2021 | Hassan et al. |

FOREIGN PATENT DOCUMENTS

| | | |
|---|---|---|
| JP | 2011113523 A | 6/2011 |
| JP | 2012133717 A | 7/2012 |
| WO | 2008082354 A1 | 7/2008 |

OTHER PUBLICATIONS

Forget, et al., "Persuasion for Stronger Passwords: Motivation and Pilot Study", In Proceedings of the 3rd international conference on Persuasive Technology, Jun. 4, 2008, pp. 140-150.

Griffin, Phillip H., "Secure Authentication on the Internet of Things", In Proceeding of SoutheastCon, Mar. 30, 2017, 5 Pages.

"Notice of Allowance Issued in U.S. Appl. No. 16/436,809", dated Jul. 10, 2020, 24 Pages.

Alghathbar, et al., "Noisy Password Scheme: A New One Time Password System", In Canadian Conference on Electrical and Computer Engineering, May 3, 2009, pp. 841-846.

"International Search Report and Written Opinion Issued in PCT Application No. PCT/US2020/030317", dated Jun. 23, 2020, 11 Pages.

"International Search Report and Written Opinion Issued in PCT Application No. PCT/US2020/030318", dated Jun. 24, 2020, 11 Pages.

Alghathbar, et al., "Noisy Password Security Technique", In the Proceedings of International Conference for Internet Technology and Secured Transactions, Nov. 9, 2009, 5 Pages.

Florencio, et al., "KLASSP: Entering Passwords on a Spyware Infected Machine Using a Shared-Secret Proxy", In the Proceedings of 22nd Annual Computer Security Applications Conference, Dec. 11, 2006, 10 Pages.

"International Search Report and Written Opinion Issued in PCT Application No. PCT/US20/030319", dated Jul. 3, 2020, 11 Pages.

"International Search Report and Written Opinion Issued in PCT Application No. PCT/US20/030331", dated Jul. 24, 2020, 13 Pages.

U.S. Appl. No. 16/436,721, filed Jun. 10, 2019, Authentication With Random Noise Symbols and Pattern Recognition.

U.S. Appl. No. 16/436,679, filed Jun. 10, 2019, Authentication With Random Noise Symbols and Pattern Recognition.

U.S. Appl. No. 16/436,802, filed Jun. 10, 2019, Pattern Matching for Authentication With Random Noise Symbols and Pattern Recognition.

U.S. Appl. No. 16/436,809, filed Jun. 10, 2019, User Interface for Authentication With Random Noise Symbols.

U.S. Appl. No. 16/436,688, filed Jun. 10, 2019, Authentication With Well-Distributed Random Noise Symbols.

U.S. Appl. No. 16/436,728, filed Jun. 10, 2019, Partial Pattern Recognition in a Stream of Symbols.

U.S. Appl. No. 16/436,745, filed Jun. 10, 2019, Partial Pattern Recognition in a Stream of Symbols.

U.S. Appl. No. 16/436,750, filed Jun. 10, 2019, Partial Pattern Recognition in a Stream of Symbols.

Chatterjee, et al., "The TypTop System: Personalized Typo-Tolerant Password Checking", In Proceedings of the ACM SIGSAC Conference on Computer and Communications Security, Oct. 30, 2017, pp. 1-20.

"International Search Report and Written Opinion issued in PCT Application No. PCT/US20/033475", dated Aug. 28, 2020, 11 Pages.

"Use of Input Distance Metric to Implement Fuzzy Password Matching", Published by IP.Com Electronic Publication, Apr. 2, 2015, 2 Pages.

Gomaa, et al., "A Survey of Text Similarity Approaches", In International Journal of Computer Applications, vol. 68, Issue 13, Apr. 1, 2013, pp. 13-18.

Mark, et al., "The Stringdist Package for Approximate String Matching", Published in the R Journal, vol. 6, Issue1, Jun. 1, 2014, pp. 111-122.

"International Search Report and Written Opinion issued in PCT Application No. PCT/US20/029991", dated Jul. 31, 2020, 11 Pages.

"International Search Report and Written Opinion issued in PCT Application No. PCT/US20/029992", dated Jul. 31, 2020, 11 Pages.

(56) References Cited

OTHER PUBLICATIONS

"International Search Report and Written Opinion Issued in PCT Application No. PCT/US20/036865", dated Sep. 23, 2020, 12 Pages.
Luo, et al., "A Mobile Authentication System Resists to Shoulder-Surfing Attacks", In Journal of Multimedia Tools and Applications, Dec. 8, 2015, pp. 14075-14087.
"International Search Report and Written Opinion Issued in PCT Application No. PCT/US20/030315", dated Aug. 10, 2020, 16 Pages.
"Non Final Office Action Issued in U.S. Appl. No. 16/436,809", dated Mar. 6, 2020, 19 Pages.
"Non Final Office Action issued in U.S. Appl. No. 16/436,728", dated Mar. 18, 2021, 24 Pages.
"International Search Report & Written Opinion issued in PCT Application No. PCT/US20/029993" dated Apr. 23, 2021, 8 Pages.
"Non Final Office Action Issued In U.S. Appl. No. 16/436,750", dated Jun. 14, 2021, 26 Pages.
"Non Final Office Action issued In U.S. Appl. No. 16/436,679", dated Jun. 24, 2021, 23 Pages.
"Non Final Office Action Issued In U.S. Appl. No. 16/436,745", dated Jun. 29, 2021, 17 Pages.
"Non Final Office Action issued in U.S. Appl. No. 16/514,747", dated Jul. 8, 2021, 13 Pages.

\* cited by examiner

DEVICE SYNCHRONIZATION WITH NOISE SYMBOLS AND PATTERN RECOGNITION

BACKGROUND

Computing devices such as Internet of Things (IoT) devices may need to synchronize with other computing devices, such as servers, or other IoT devices for a variety of reasons. To synchronize, a transmitting device may send a synchronization symbol sequence to a receiving device. The receiving device recognizes the synchronization symbol sequence and in response, takes a specified synchronization action. For example, the synchronization symbol sequence may be used to determine bit, word, byte, and packet structures in a transmission. As another example, certain computing devices may operate in a low power state, monitoring for a synchronization symbol sequence that command the device to wake up and transmit data.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
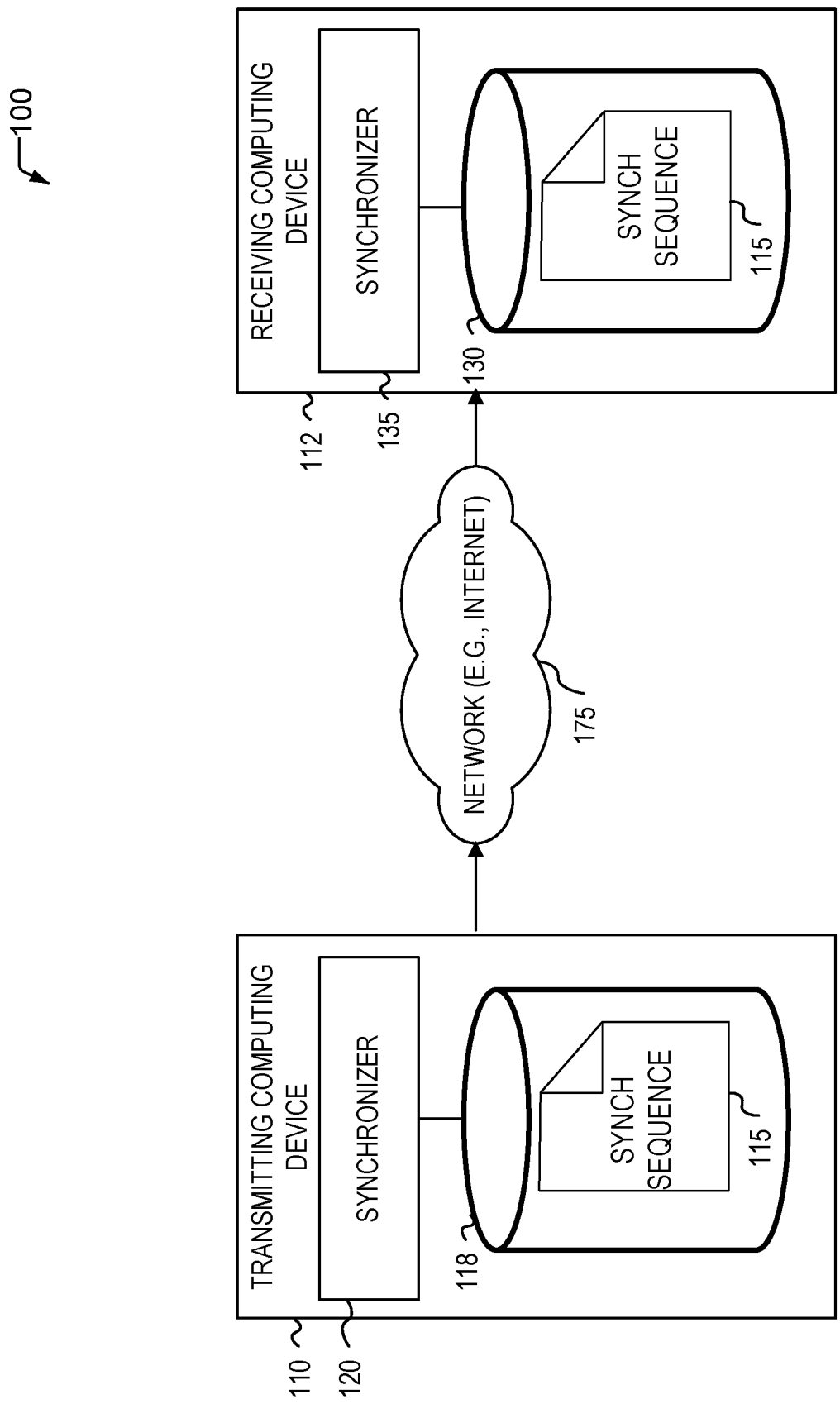
FIG. 1 illustrates an example synchronization environment in which a transmitting computing device sends a synchronization symbol sequence to a receiving computing device, according to some examples of the present disclosure.

Computing devices that rely upon synchronization symbol sequences typically search received data for an exact match to the expected synchronization symbol sequence. Requiring an exact match has consequences where noise in a communication channel between the transmitting and receiving devices may cause noise symbols to be interspersed with the synchronization symbols causing a failure to synchronize or a loss of synchronization. Failing to synchronize or losing synchronization may be problematic in situations where, for example, the computing device has data to send that is accumulating in a buffer on the device. Failing to synchronize may not allow data to be transmitted from the buffer. As the buffer fills up, if the device is not able to synchronize, new data may overwrite old data in the buffer and the old data may be lost. This problem may be particularly acute in IoT devices that accumulate sensor data.

Further, in the case of some computing devices, synchronization packets may be a tempting target for malicious actors. For example, a malicious actor may replay a synchronization packet to elicit the recipient to send data to the malicious actor. In other examples, a malicious actor may replay a synchronization packet to send data to the recipient that may be a malicious payload. In some examples, if the synchronization packet wakes up the computing device, by intercepting a wake-up sequence and replaying the sequence, the attackers may command the computing devices to wake up. This may cause devices on battery power to have their batteries drained sooner, or cause data to be sent that was not supposed to be sent.

Disclosed in some examples are methods, systems and machine-readable mediums which allow for more secure and robust synchronization by implementing synchronization systems with sequences that may include interspersed noise symbols. These systems reduce the amount of failed synchronization attempts because they allow for synchronization despite one or more noise symbols N in indeterminate positions that are not known in advance by the recipient device during a synchronization attempt. Additionally, in some examples, the sending device may intentionally intersperse noise symbols N in the synchronization symbol sequence to provide higher amounts of security from eavesdroppers and to help prevent replay attacks as there is no way for an eavesdropper to determine in advance where the noise symbols are, and subsequently what the synchronization symbol sequence is. In yet other examples, the introduction of interspersed noise symbols may be required to synchronize to increase the security of the synchronization.

While these synchronization systems are more secure, they are not easy to implement. For example, since the position of the noise symbols is not known by the receiving computing device, it is not easy to ignore the noise symbols N to determine if the remaining symbols match the synchronizing symbol. Disclosed herein are methods for efficiently determining whether a synchronization symbol sequence is present in data symbols received even with noise symbols N.

The present disclosure solves a technical problem of missed synchronizations as well as synchronization security vulnerabilities by introducing a synchronization process that is tolerant of inadvertently and/or intentionally introduced noise symbols. This enhances the success rate of synchronization attempts, especially in noisy environments over traditional exact-match synchronization systems. Additionally, the use of noise symbols N may be utilized to prevent malicious actors from appropriating the synchronization symbol sequence. Thus, the present invention improves the functioning of computing devices by reducing synchronization failures and increasing synchronization security.

These techniques may be used in Internet of Things devices by allowing for low-power synchronization prior to transmitting data. Other use cases for the disclosed techniques may include use in cellular devices for synchronizing with other cellular devices (P2P) or for synchronizing with the base station. Further use cases may include communications between clients and Edge computing devices and the like.

FIG. 1 illustrates an example synchronization environment 100 in which a transmitting computing device 110 sends a synchronization symbol sequence 115 to a receiving computing device 112, according to some examples of the present disclosure. As used herein, a transmitting computing device 110 attempts to synchronize with a receiving computing device 112 by sending a synchronization symbol sequence 115. The terms are used with reference to their respective roles during synchronization. It is understood that the transmitting computing device 110 may receive data transmitted from the receiving computing device 112 and the receiving computing device 112 may transmit data.

A synchronization symbol sequence 115 may be sent by the transmitting computing device 110 over a network 175. As noted previously, the synchronization may be for the purposes of beginning a data transmission to align packet, byte, or other data unit boundaries; may be for the purposes of waking the computing device; or the like. Network 175 may include any computing network, including a local area network (LAN), wide area network (WAN), the Internet, or the like.

The transmitting computing device 110 may determine that synchronization is necessary with the receiving computing device 112. For example, the transmitting computing device 110 may wish to exchange data with the receiving computing device 112 and as part of the data exchange the transmitting computing device 110 may need to synchronize with the receiving computing device 112. Synchronizer 120 may read the synchronization symbol sequence 115 from a database 118 and transmit it over the network 175 to receiving computing device 112. The synchronization symbol sequence 115 may be a unique sequence for each receiving computing device (the recipient computing device that receives the synch transmission with the synch sequence) or may be a same synchronization symbol sequence for each receiving computing device. In some examples, the synchronization symbol sequence may be unique to each transmitting computing device, but in other examples it may be the same for each computing device. In yet additional examples, the synchronization symbol sequence 115 may be different for each sending and receiving computing device pair. In examples in which the synchronization symbol sequence 115 is different for one or more of the transmitting and/or receiving computing devices, the synchronizer 120 may calculate the synchronization symbol sequence 115 either in advance, or as part of the synchronization process. In some examples, one or more formula and parameters for the formula may be stored in the database 118 and/or determined by the synchronizer 120 as part of, or before the synchronization process.

Figure 2:
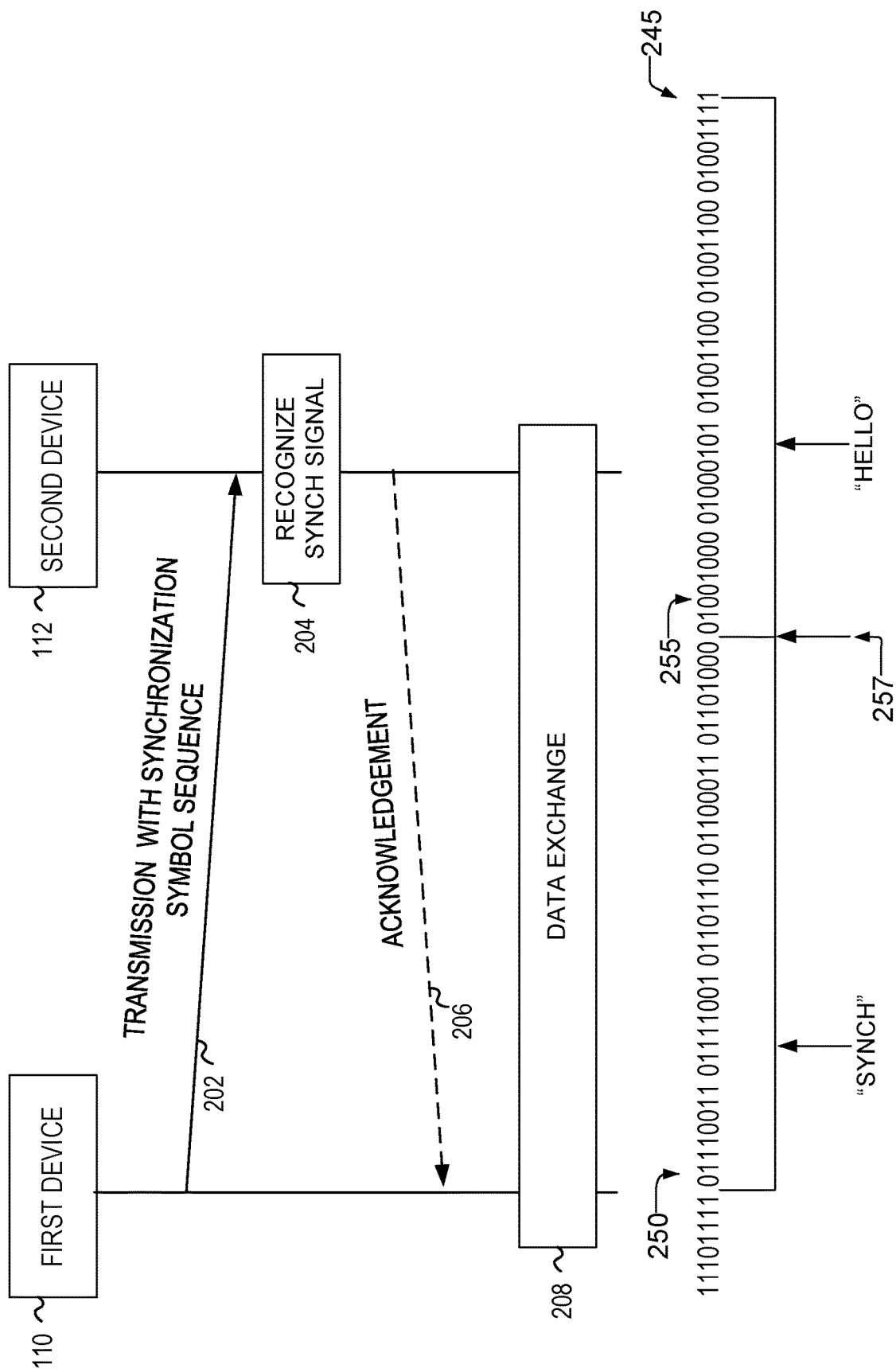
FIG. 2 illustrates a message sequence chart of an example synchronization attempt between the transmitting computing device and the receiving computing device, according to some examples of the present disclosure.

The synchronization symbol sequence 115 may be stored as part of the instructions of the synchronizer 120 (e.g., as part of the object code of the synchronizer 120), stored separately in a data store or database 118, retrieved from a server, or the like. The transmission with the synchronization symbol sequence may be a separate synchronization message or packet; or the synchronization symbol sequence may be included in another packet or transmission as a header or preamble. For example, as shown in FIG. 2, synchronization symbol sequence data 250 precedes data 255. In some examples, one or more noise symbols N may be added to the synch sequence 115. The noise symbols may not be known in advance to the receiving computing device 112 for this particular synchronization attempt.

The receiving computing device 112 receives the transmission and the synchronizer 135 checks the received bitstream to determine if the synch sequence received matches the expected synchronization symbol sequence 115. The synchronizer 135 may be configured to determine that the received synchronization symbol sequence transmitted from the transmitting computing device 110 matches the expected synchronization symbol sequence 115 despite the presence of one or more noise symbols N interleaved with the synchronization symbol sequence 115. In some examples, all the symbols of the synchronization symbol sequence 115 may be required to be present (albeit with noise symbols N interleaved) and in a same order. In other examples, a perfect match, even when excluding the interleaved noise symbols N is not required. In still other examples, a subset of the synchronization symbol sequence 115, but not the entire synchronization symbol sequence 115 may be utilized and the synchronizer 135 is configured to look for a subset and reject synchronization attempts with the full synchronization symbol sequence 115. As noted, the noise symbols N may be added by the synchronizer 120 or by noise on the network 175.

As noted previously, in some examples the synchronization symbol sequence 115 is different for one or more of the transmitting and/or receiving computing devices. In these examples, like synchronizer 120, the synchronizer 135 may calculate the synchronization symbol sequence 115 either in advance, or as part of the synchronization process. In some examples, one or more formula and parameters for the formula may be stored in the database 130 and/or determined by the synchronizer 135 as part of, or before the synchronization process.

FIG. 2 illustrates a message sequence chart of an example synchronization attempt between the transmitting computing device 110 and the receiving computing device 112. The transmitting computing device 110 transmits a synchronization symbol sequence 202. The transmission 202 may include a plurality of symbols in a particular order and may include a synchronization symbol sequence. In some examples, the synchronization symbol sequence may be transmitted in a synchronization packet or header. At operation 204 the receiving computing device 112 recognizes the synchronization symbol sequence. For example, the synchronization symbol sequence may be exactly matched to the expected synchronization symbol sequence or may be matched with interspersed noise symbols N. In some examples, the match is determined based upon the received synchronization symbols being less than a defined distance from the exact synchronization symbol sequence.

In some examples, an acknowledgment 206 may be sent by the receiving computing device 112 acknowledging receipt of the synchronization symbol sequence. In some examples, a data exchange 208 may take place whereby the first and second device transmit and/or receive data packets. In some examples, the data exchange 208 may be part of the transmission with the synchronization symbol sequence 202, such as shown with bitstream 245.

The receiving computing device 112 searches bitstream 245 of transmission 202 for the synchronization symbol sequence 250. In the example of FIG. 2, the synchronization symbol sequence is a binary ASCII encoding of the string "SYNCH". A noise symbol with a value of "11101111" appears prior to the synchronization symbol sequence 250. Bitstream 245 includes synchronization symbol sequence data 250 that match the expected synchronization symbol sequence. The receiving computing device 112 may then begin receiving data at synchronization point 257 which immediately follows the last symbol of the synchronization symbol sequence. E.g., the receiving computing device 112 aligns a data-buffer, byte boundary, or the like with the synchronization point 257. In this case, the bitstream following synchronization point 257 is a binary ASCII encoding of the string "HELLO".

In some examples, to find the synchronization symbol sequence, various permutations of received symbol sequences of length m (where m is the length in symbols of the synchronization symbol sequence) are compared with the expected synchronization symbol sequence to determine a correlation or other distance metric between the permutation and the expected synchronization symbol sequence. For example, in the example of FIG. 2, the synchronization symbol sequence is five bytes long. The synchronizer 135 of the receiving computing device 112 creates a set of vectors from the beginning of bitstream 245 with all possible combinations of five in-order symbol sequences—that is, symbols may be skipped, but are in a same order in the vectors relative to other symbols as they were received. Each of these vectors may be input along with the expected synchronization symbol sequence to determine a distance metric (such as a correlation). If the distance metrics meet a defined condition (e.g., a vector with the smallest distance metric is within a defined threshold of the sequence, or if the vector with the smallest distance matches the synchronization symbol, or the like), the computing device may determine a synchronization point—such as synchronization point 257 based upon the identified synchronization point (e.g., just after the last symbol from the vector with the smallest distance metric).

Figure 3:
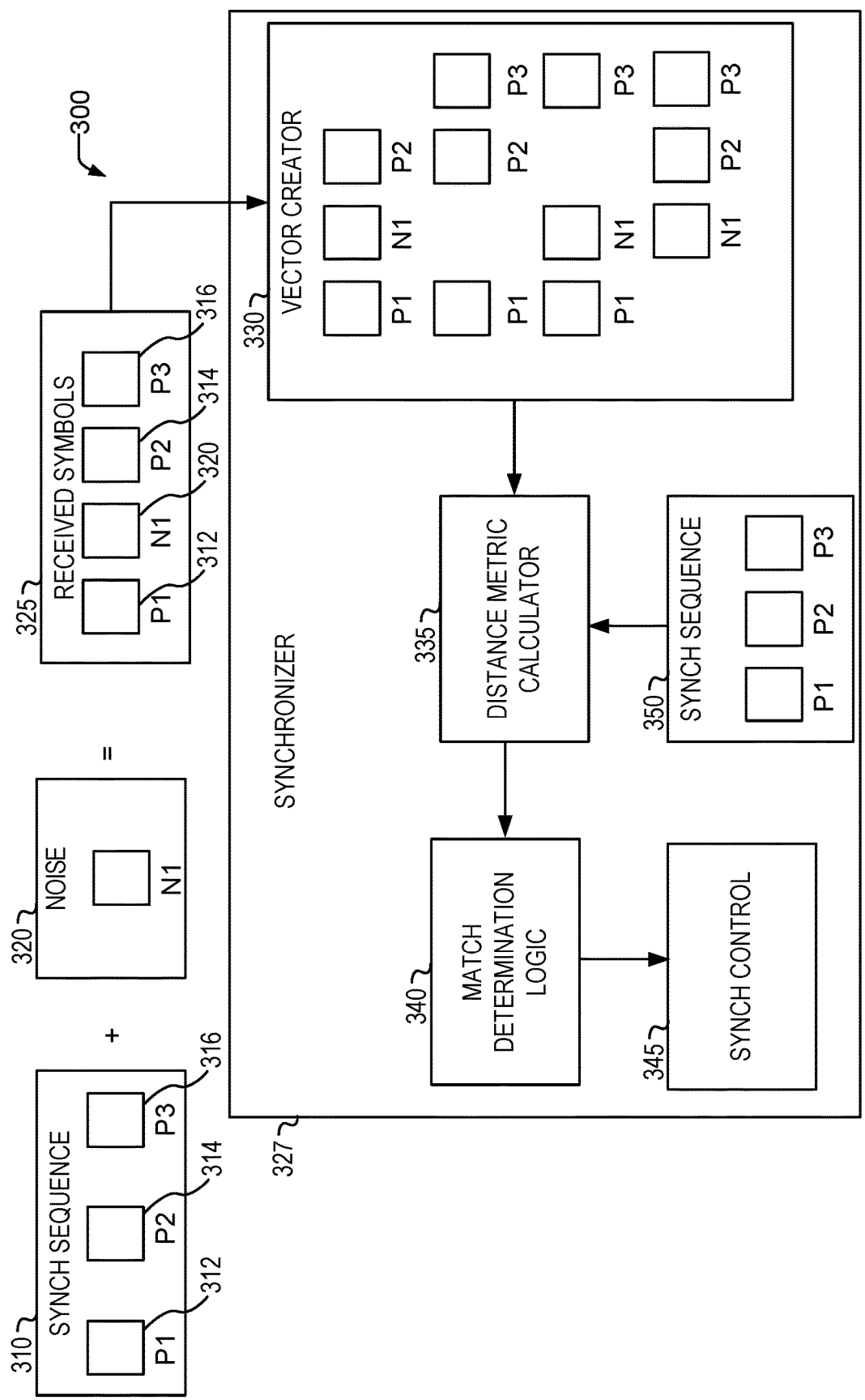
FIG. 3 illustrates a diagram of a data flow of a synchronization check with additional, unspecified noise symbols possibly included according to some examples of the present disclosure.

FIG. 3 illustrates a diagram of a data flow 300 of a synchronization check with additional, unspecified noise symbols possibly included according to some examples of the present disclosure. According to the example data flow 300, the synchronization symbol sequence 310 may comprise three symbols 312, 314, and 316 {P1, P2, P3} in that order. The transmitting computing device or the network adds noise symbols 320 to the synchronization symbol sequence 310. In the example shown in FIG. 3, for ease of description, only one noise symbol 320 is added. The received symbols 325 that are received by the receiving computing device include the received symbols 312, 314, and 316 (in order) along with the one or more noise symbols 320 inserted into the synchronization sequence symbols.

The synchronizer 327 of the recipient computing device includes a vector creator 330 that receives the received symbols 325 and creates a plurality of vectors of length m, where m is a number of symbols of the expected synchronization symbol sequence 350. The vectors reflect each of the possible in-order, length m combinations of the received symbols 325. The order of the symbols in each of the vectors is a same order as an order of the symbols in the received symbols 325. That is, if the received sequence is "14234", and the synchronization symbol sequence is "123" then the vectors would all be of length three and would reflect all the possible in-order (i.e., each symbol maintains the order it appeared in from the received symbols 325) combinations. In this example, the vectors would be:
<1,4,2>, <1, 2, 3>, <1, 3, 4>, <4, 2, 3>, <4, 3, 4>, and <2, 3, 4>.

Each vector is then passed to a distance metric calculator 335 that calculates a distance between each of the vectors and a vector of the expected synchronization symbol sequence 350. In some examples, the distance metric may be a Levenshtein distance. In other examples, a distance metric may compare each symbol of each vector to the corresponding position in the synchronization symbol sequence 350. If the symbols match, then the score may not be incremented. If the symbols do not match, the score may be incremented. In other examples, a higher score reflects a better match and thus symbols that match may cause the score to be incremented and symbols that do not match may cause no change in the score or may cause the score to be decremented. In still other examples, the distance metric may be a correlation to the expected synchronization symbol sequence 350, such as a Pearson correlation coefficient. In other examples, other edit distance metrics or algorithms may be used.

The distance metrics for each of the vectors is then passed to the match determination logic 340. In some examples, the match determination logic 340 identifies the distance metric that signifies a closest match with the expected synchronization symbol sequence 350 (e.g., a smallest distance). This may be a highest score (in the case of assigning points for a match), or may be a lowest score, depending on the implementation desired. If the distance metric that signifies the closest match is closer than a threshold value to the expected synchronization symbol sequence 350 (e.g., the distance is smaller than a threshold), then the match determination logic 340 may return that a match is found. In an example, meeting the threshold value may require a perfect match. In other examples, the match determination logic 340 identifies two distance metrics that signify the two closest matches with the expected synchronization symbol sequence 350 (e.g., a smallest distance and a second smallest distance). The match determination logic 340 may then take the ratio of the two distance metrics and compare that to a threshold to determine whether there is a match. In some examples, the use of a threshold allows for synchronization even when a sequence in the received symbols 325 is close, but less than perfect match for the expected synchronization symbol sequence 350. This may allow for some level of noise tolerance where symbols of the synchronization symbol sequence 310 are replaced by noise symbols during transmission.

Synchronization control 345 may then determine whether synchronization is achieved based on the result from match determination logic 340. Synchronization control 345 may take one or more synchronization actions if the synchronization control 345 determines that synchronization is achieved. For example, synchronization control 345 may wake up the computing device from a low power state to prepare the device to transmit and/or receive data. In some examples, synchronization control 345 may determine a start position in the received symbols 325 of actual data using the vector that signified the closest match (e.g., the symbol in the received symbols 325 immediately following the position corresponding to the last symbol in that vector).

Figure 4:
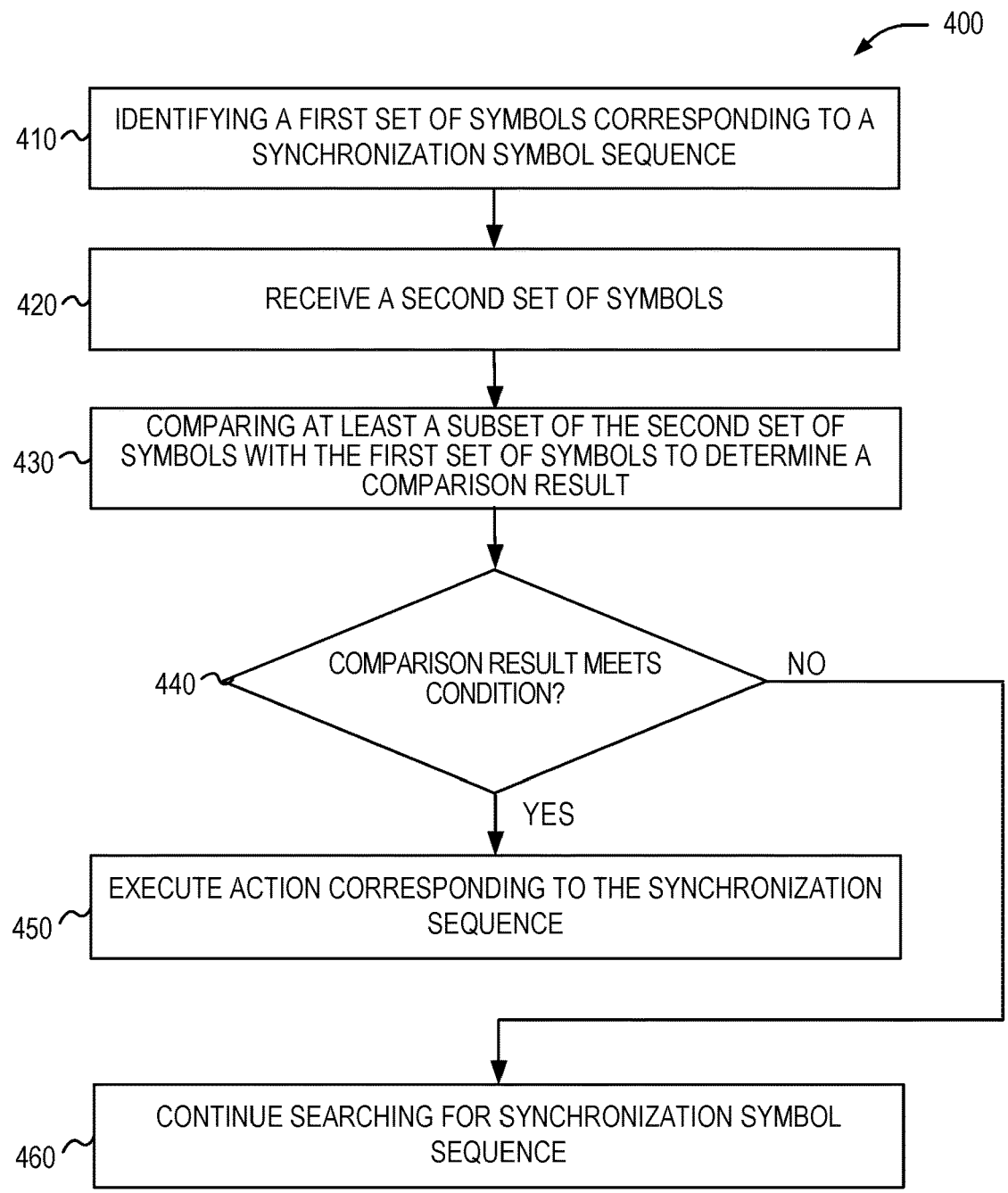
FIG. 4 illustrates a flowchart of a method of synchronizing computing devices according to some examples of the present disclosure.

FIG. 4 illustrates a flowchart of a method 400 of synchronizing computing devices according to some examples of the present disclosure. At operation 410 the synchronizer identifies a first set of symbols corresponding to an expected synchronization symbol sequence. For example, the first set of symbols may be stored in object code of a process executing on the receiving computing device. In other examples, the first set of symbols may be calculated by the receiving computing device based upon the transmitting computing device and/or the receiving computing device as previously described. As used herein, a symbol is a unit of data, such as a bit, a word, a byte, a character, or other group of data.

At operation 420, the synchronizer receives a second set of symbols to be compared with the expected synchronization symbol sequence, the second set of symbols may include more symbols than the first set of symbols (e.g., noise symbols). For example, the noise symbols may be added by the sending device intentionally to prevent eavesdropping and replay attacks or may be added unintentionally by the network as a result of noise, or some symbols may be added by the network and some symbols may be added by the network. The second set of symbols may be in a packet or other communication or transmission from a transmitting computing device. The second set of symbols may be a discrete portion of the packet or transmission or may be a stream of symbols transmitted from the transmitting computing device. In some examples, the second set of symbols may be received over a signal channel. The signal channel may be a peer-to-peer wireless connection, a broadcast connection, an Internet connection or the like. The signal channel may be any wireless network connection with another device whether through a network or directly.

At operation 430 the synchronizer compares at least one subset of the second set of symbols with the first set of symbols to determine a comparison result, the at least one subset having the first number of symbols, the at least one subset skipping at least one symbol that is between at least two other symbols of the second set of symbols that are included in the at least one subset. For example, and as shown in FIG. 3 with respect to the vector creator 330), the synchronizer may decompose the received symbols received at operation 420 into a plurality of vectors (subsets) that represent each in-order combination of the received sequence that is of a length m, where m is the length of the expected synchronization symbol sequence determined at operation 410. This may include skipping one or more symbols that may be noise symbols. One or more of the vectors (subsets) may be compared with the expected synchronization symbol sequence. For example, by determining if the one or more of the vectors is a perfect match. In other examples, the comparison maybe a distance metric, such as a correlation that quantifies a similarity between the expected synchronization symbol sequence and the one or more vectors.

At operation 440, the synchronizer determines whether one or more of the comparisons meets a specified condition. For example, the synchronizer determines whether one or more of the comparisons indicates an exact match. In other examples, the synchronizer may determine that one or more of the comparisons indicates a distance that is below a threshold distance. For example, a comparison with the shortest distance may be compared to a threshold distance. In still other examples, the synchronizer may determine whether a ratio of a smallest distance and a next smallest distance found in the comparison at operation 430 is above or below a threshold ratio.

If the comparison meets the specified condition, then at operation 450 the system may execute an action corresponding to the synchronization sequence. For example, the device may be brought from a low-power state to a state that in which the device is able to transmit and/or receive data. In other examples, a communication symbol or data structure boundary (e.g., a symbol boundary) may be established based upon the vector that is the smallest distance and/or a perfect match—for example, the symbol in the second set of symbols immediately after the last symbol in the vector that is the closest distance to the expected synchronization symbol sequence. In some examples, the action performed may depend on the synchronization symbol sequence. That is, the receiving device may look for multiple different synchronization symbol sequences and perform different actions depending on the sequence received. If the comparison does not meet the condition, then at operation 460 the device may continue to search or wait for the synchronization symbol sequence.

Figure 5:
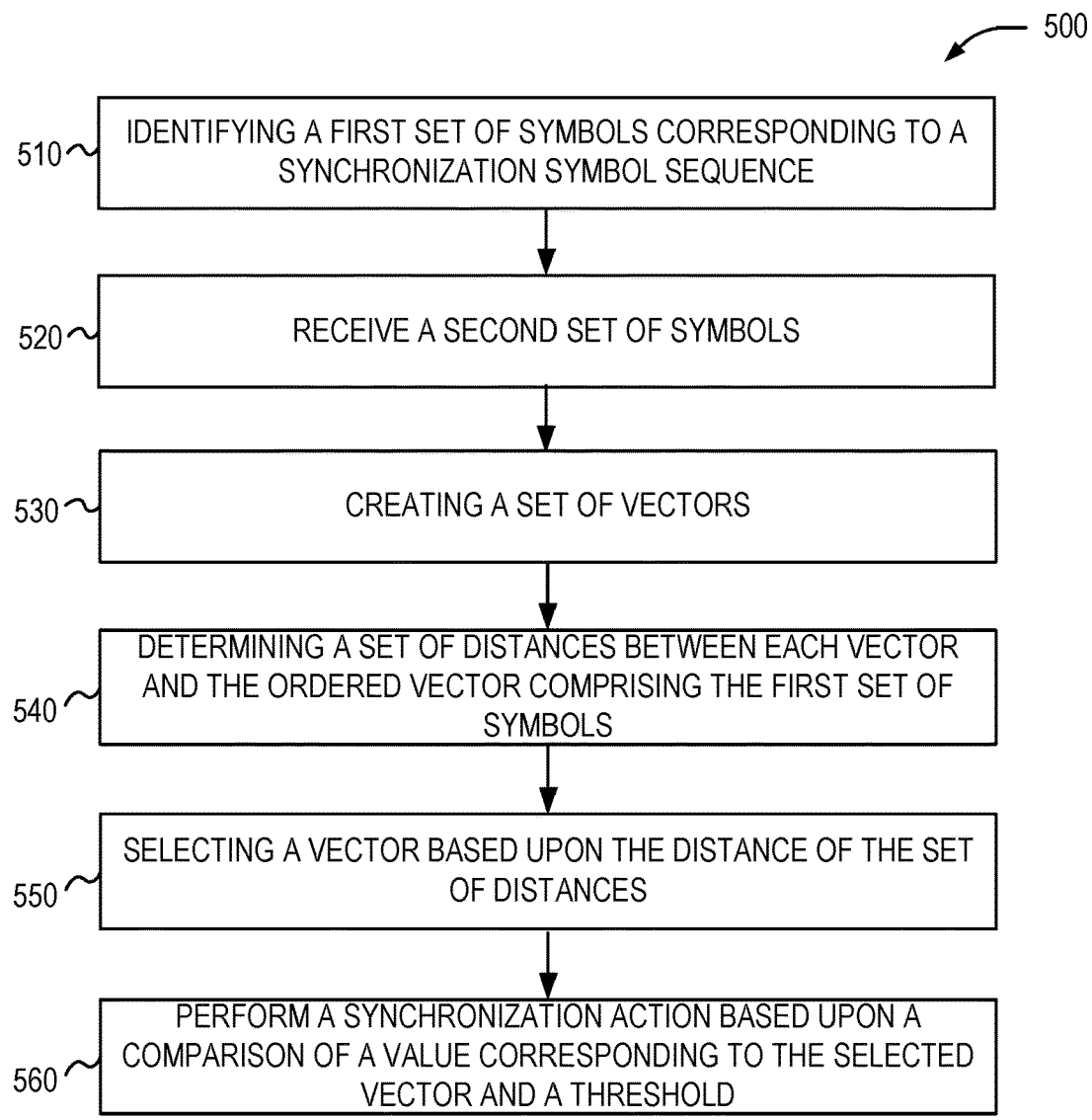
FIG. 5 illustrates a flowchart of a method of synchronizing computing devices according to some examples of the present disclosure.

FIG. 5 illustrates a flowchart of a method 500 of synchronizing computing devices according to some examples of the present disclosure. The method 500 may be one example implementation of method 400 of FIG. 4 and may be performed by a receiving computing device that is receiving a synchronization symbol sequence from a transmitting computing device. At operation 510 the synchronizer identifies a first set of symbols corresponding to a synchronization symbol sequence. For example, by consulting a database, reading a memory location, or the like. As noted, the synchronization symbol sequence may be specific to the transmitting computing device, the receiving computing device, or both computing devices. In these examples, a device identifier may be used to select or determine the synchronization symbol sequence. For example, a synchronization symbol sequence may be based upon a device identification of the transmitting computing device, the receiving computing device or both.

At operation 520, the synchronizer receives a second set of received symbols during a synchronization attempt. In some examples, the received set of symbols includes more symbols than a first set of symbols corresponding to an expected synchronization symbol sequence. For example, the received symbols may include noise symbols. At operation 530, the synchronizer creates a set of two or more vectors, each vector having a length corresponding to a length of a vector comprising the first set of symbols corresponding to the expected synchronization symbol sequence and each vector comprising a different ordered combination of the received set of symbols. The different ordered combinations of the received set of symbols ordered in a same order as the symbols were received. For example, if a received set of symbols is an encoding of the string {p,#,a,r,s,s} and the expected synchronization symbol sequence is an encoding of the string {p,a,s,s} then a set of vectors of length 4 are created. In this example, the system would create a vector for each 4 character in-order combination of the received set of symbols.

By in-order it is meant that the symbols in the vector maintain the ordering of the symbols in the received symbols relative to each other. Put differently, if the symbol "p" is the first character in the second set of symbols and if the character 'p' is in one of the created vectors (it is not skipped), "p" would always be first among the vector symbols. Continuing the example from the second set of symbols of {p,#,a,r,s,s}—an 'a' character in the vector would be either first (if 'p' was not in the vector) or second (if 'p' is in the vector) among the synchronization symbol sequence symbols. So, in the above example, the following are valid vectors:
 1. p #ar
 2. #ars
 3. arss
 4. pars
 5. prss
 6. p #rs
 7. pass
 8. #rss
 9. #ass
 10. p #as
 11. p #ss At operation 540, the synchronizer may determine a set of distances between each respective vector and the ordered vector comprising the first set of symbols corresponding to the expected synchronization symbol sequence. As previously noted, the set of distances may be determined by one or more distance metrics, such as a Levenshtein distance; a simple point total where points are added or subtracted based on differences in the symbols; or a statistical correlation. For example, a system utilizing a point value system may add a value of 1 to a score for symbol positions that do not match and a value of 0 to symbol positions that do match the expected synchronization symbol sequence. In the example above, using this simple distance metric, the distances would be: {3, 2, 2, 1, 1, 2, 0, 2, 2}. In still other examples, the vectors may simply be compared to the expected synchronization symbol sequence to determine if there is a match. In yet additional examples, the distance metric may be a statistical correlation.

At operation 550, the system may select a vector of the set of vectors based on the distance of the set of distances. For example, the system may select a vector with the shortest distance to the vector of the expected synchronization symbol sequence. In the example above, the vector 'pass' has a distance of '0' and so that vector may be selected.

At operation 560, the system may, based upon the comparison of a value corresponding to the selected vector and a threshold, perform one or more synchronization actions. For example, if the value corresponding to the selected vector is a distance metric and the distance is closer to the first set of symbols than a threshold distance, then the system may perform a synchronization action. Example synchronization actions include waking the device from a low power state, beginning to store data, aligning a symbol boundary, and the like.

Forced Insertion of Noise Symbols

As noted previously, in some examples the system may force the use of noise symbols within the stored synchronization sequence symbols. This may prevent the transmitting device from sending the synchronization sequence symbols without the additional protections the noise symbols offer against eavesdroppers. The synchronizer may reject synchronization attempts where the received symbols do not include the noise symbols. In some examples, only a single noise symbol may be required, but in other examples a threshold amount of noise symbols may be required. In some examples, the system may combine a length cap on received symbols with a forced symbol insertion such that the device must include a number of symbols that falls within a minimum and a maximum number of symbols.

In some examples, to prevent a device from simply repeating symbols of the synchronization sequence, the system may require that the noise symbols be symbols that are not present in the synchronization symbol sequence. Thus, if the synchronization symbol sequence is an encoding of the string "pass" then the noise symbols must be symbols other than encoded characters of 'p' 'a' 's' 's'. If the noise symbols include symbols from the synchronization symbol sequence, synchronization may fail. In some other examples, some repeated symbols from the synchronization symbol sequence may be allowed, however a difference metric may be calculated by the receiver that quantifies how different the expected synchronization symbol sequence is from the received symbols. A minimum difference value may be required for synchronization to be successful.

Figure 6:
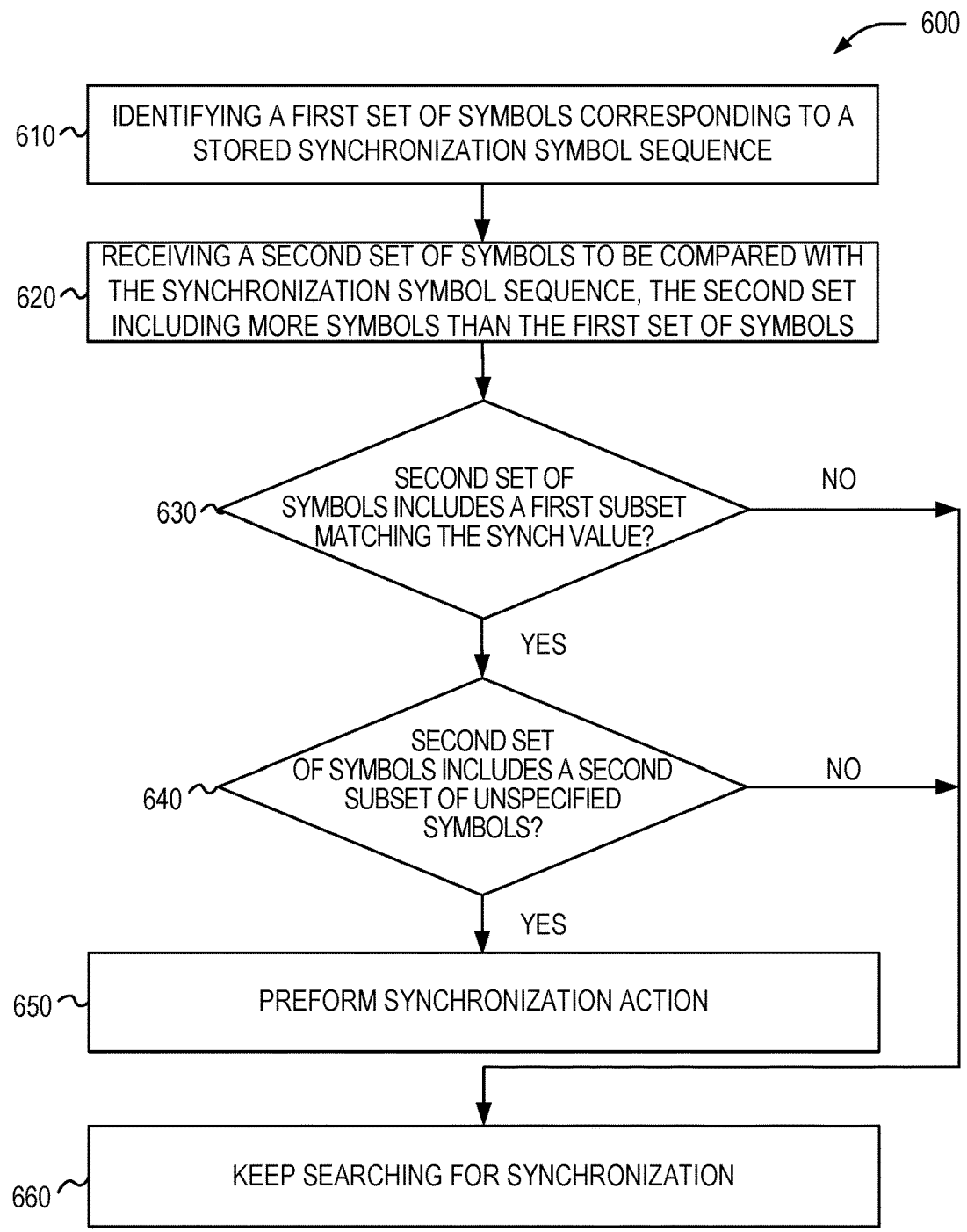
FIG. 6 illustrates a flowchart of a method of synchronizing a device with enforced symbol insertion according to some examples of the present disclosure.

FIG. 6 illustrates a flowchart of a method 600 of synchronizing a device with enforced symbol insertion according to some examples of the present disclosure. At operation 610 the synchronizer identifies a first set of symbols corresponding to an expected synchronization symbol sequence. As used herein, a symbol is a unit of data, such as a character, a word, a byte, or other group of data. At operation 620, the synchronizer receives a second set of symbols (e.g., symbols) to be compared with the expected synchronization symbol sequence, the second set of symbols includes more symbols than the first set of symbols (e.g., noise symbols).

At operation 630 the synchronizer determines if the second set of symbols includes a first subset of symbols matching the expected synchronization symbol sequence. If the second set of symbols does not include the expected synchronization symbol sequence, then at operation 660, the computing device may continue searching for a synchronization symbol sequence. If the second set of symbols includes the expected synchronization symbol sequence, then processing moves to operation 640. In some examples, to determine whether the second set of symbols includes the expected synchronization symbol sequence the second set of symbols may be decomposed into a set of size m in-order vector combinations of the second set of values, where m is a number of symbols in the expected synchronization symbol sequence. The vectors reflect each of the possible in-order length m combinations of the received symbols. A distance metric may be calculated for each of the vectors that measures a distance between the expected synchronization symbol sequence and each vector. The decision of whether the second set of symbols includes the expected synchronization symbol sequence may be based on the distance metrics and whether at least one of the distance metrics is within a threshold distance of the expected synchronization symbol sequence.

At operation 640, the synchronizer determines whether the second set of symbols includes a second subset of unspecified (e.g., noise) symbols in one or more unspecified positions within the second set of symbols. For example, the synchronizer determines whether noise symbols are added to the synchronization symbol sequence. In some examples, the synchronizer may ensure that additional symbols were sent that are interleaved with the expected synchronization symbol sequence to ensure that the device is secured from eavesdropping attacks. If there are no additional noise symbols added, then at operation 660 the device may continue searching for synchronization symbol sequences. Otherwise, at operation 650 a synchronization action may be performed.

It is noted that the synchronizer does not need to specify for any synchronization attempt where the noise symbols are to be placed, and what the noise symbols are. This protects the synchronization symbol sequence by preventing eavesdropping of these locations. In some examples, a particular number of noise symbols may need to be inserted. In some examples, the noise symbols may need to be distributed throughout the synchronization symbol sequence so as to meet a threshold measure of spread. In some examples, whether the second set of symbols includes a second subset of unspecified symbols of operation 640 may be determined based upon the in-order vectors determined at operation 630. For example, if the in-order vector that has a closest distance metric to the expected synchronization symbol sequence was formed by skipping a minimum number of symbols, then it may be determined that the second set of symbols includes a second subset of unspecified symbols.

Enforced Symbol Distribution

The synchronizer on the receiver computing device may require that the measure of spread of the positions of noise symbols in received synchronization symbol sequences be above a specified threshold to ensure that the noise symbols are properly distributed throughout the synchronization symbol sequence. This prevents a device from simply stuffing noise characters before, after, or in one place in the synchronization symbol sequence. By enforcing some level of distribution, it makes it harder for an adversary to determine which symbols are noise symbols even if they manage to intercept multiple synchronization attempts. In some examples, the system may also specify that the measure of spread be below a specified threshold to ensure that perfect distributions of noise symbols throughout the synchronization symbol sequence are also avoided, as a perfect distribution may also be easy for an eavesdropper to figure out. The system may desire to obtain what appears to be a random distribution of noise symbols in synchronization symbol sequences by requiring a measure of spread to be within a particular range.

In some examples, the system may also store a history of a calculated measure of spread for past synchronization attempts for a specified number of synchronizations or for a specified time frame. The system may require the measure of spread to be varied over time, such that synchronization attempts with received symbols that are either a same measure of spread, or are similar (e.g., within a threshold number) to each other may be rejected. This may assist in promoting randomness in distributing the noise symbols. In some examples, the system may statistically analyze a transmitting device's measurements of spreads for past synchronization attempts. Example statistical analysis include calculations of a standard deviation of the measurements of spread. If the standard deviation is lower than a threshold, the system may adjust the target range of the measurement of spread to move the standard deviation toward the threshold. In this way, the system monitors the distribution of noise symbols in the synchronization symbol sequence symbols over time to better achieve a random appearance.

The present disclosure thus solves a technical problem of providing secure synchronization using a secure synchronization symbol sequence that is resistant to man-in-the middle attacks. By enforcing good noise symbol distribution, the system may ensure that devices comply with security enhancing aspects of the present disclosure by ensuring that the synchronization symbol sequences are not easily deciphered from the received symbols. For example, the present system may ensure that the noise symbols appear random, rather than following a discernable pattern.

Figure 7:
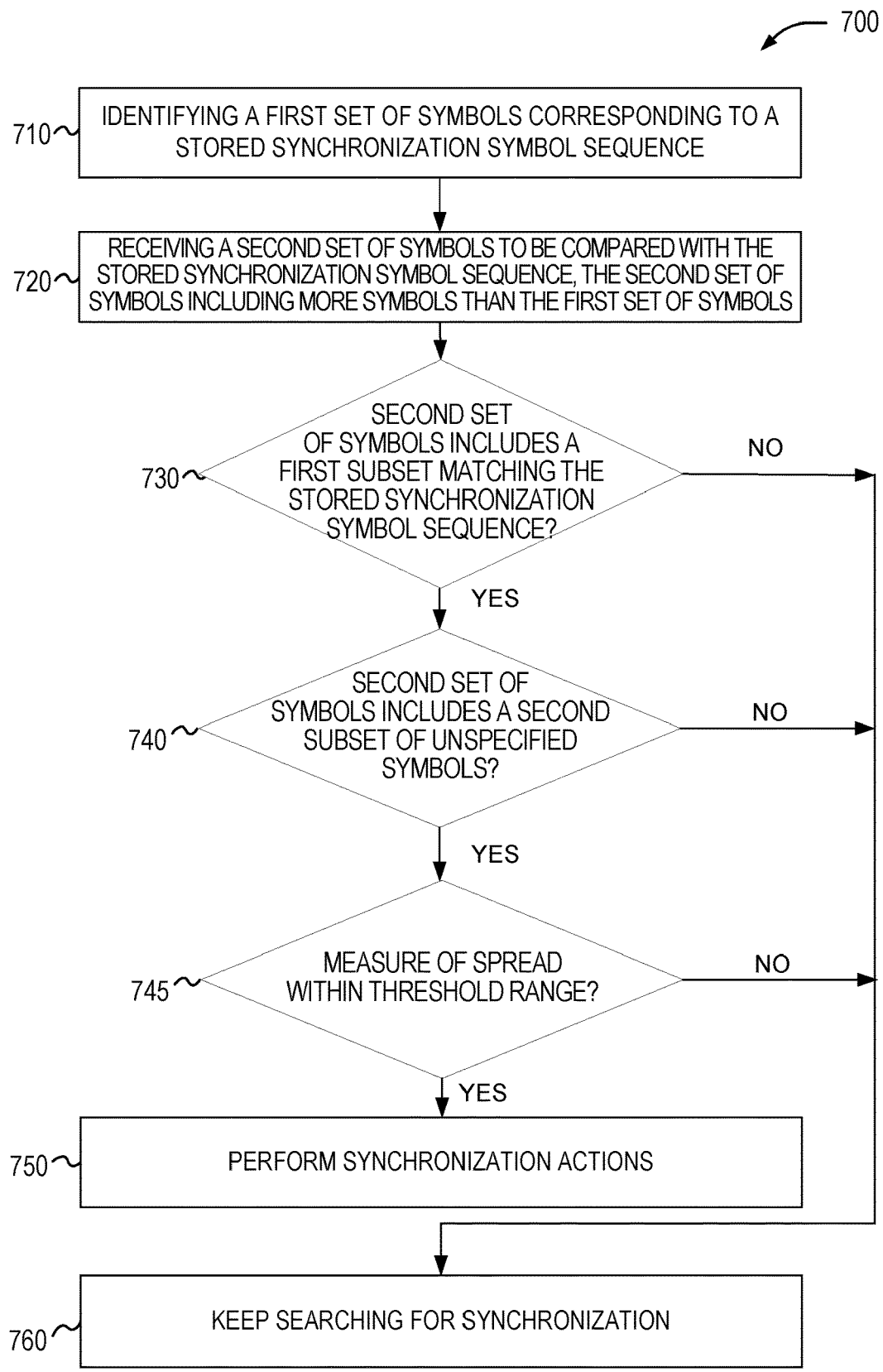
FIG. 7 illustrates a flowchart of a method of synchronizing a device with a measure of spread criteria according to some examples of the present disclosure.

FIG. 7 illustrates a flowchart of a method 700 of synchronizing a device with a measure of spread criteria according to some examples of the present disclosure. At operation 710 the synchronizer identifies a first set of symbols corresponding to an expected synchronization symbol sequence, such as a synchronization symbol sequence. At operation 720, the synchronizer receives a second set of symbols to be compared with the expected synchronization symbol sequence, the second set of symbols includes more symbols than the first set of symbols. For example, the symbols may be received synchronization symbol sequence symbols.

At operation 730 the synchronizer determines if the second set of symbols includes a first subset of symbols matching the expected synchronization symbol sequence. For example, the synchronizer determines if the second set of symbols includes the expected synchronization symbol sequence (e.g., synchronization symbol sequence). If the second set of symbols does not include the expected synchronization symbol sequence, then at operation 760, the computing device may keep searching for a synchronization symbol sequence. If the second set of symbols includes the expected synchronization symbol sequence, then processing moves to operation 740. In some examples, to determine whether the second set of symbols includes the expected synchronization symbol sequence the second set of symbols may be decomposed into a set of size m in-order vector combinations of the second set of symbols, where m is a number of symbols in the expected synchronization symbol sequence. The vectors reflect each of the possible in-order length m combinations of the received symbols. A distance metric may be calculated for each of the vectors that measures a distance between the expected synchronization symbol sequence and each vector. The decision of whether the second set of symbols includes the expected synchronization symbol sequence may be based on the distance metrics and whether at least one of the distance metrics is within a threshold distance of the expected synchronization symbol sequence.

At operation 740, the synchronizer determines whether the second set of symbols includes a second subset of unspecified symbols in one or more unspecified positions within the second set of symbols. For example, the synchronizer determines whether noise symbols are added to the synchronization symbol sequence symbols. In some examples, the synchronizer may ensure that additional symbols are entered to ensure that the devices are secured from man-in-the middle attacks. If there are no additional noise symbols added, then at operation 760 the device continues searching for a synchronization symbol sequence. Otherwise, processing may continue at operation 745. In some examples, the transmitting device does not specify for any synchronization attempt where the noise symbols are to be placed, and what the noise symbols are. In other examples, the transmitting device may specify where the noise symbols are to be place and/or what the noise symbols are.

At operation 745 the system may determine whether a measure of spread of respective positions of the first set within the second set of symbols or the second set of symbols within the first set of symbols is within a threshold range or otherwise meets one or more specified criteria. Thus, the system may (depending on the design) determine how distributed the first set is within the second set of symbols (e.g., how distributed the synchronization symbol sequence symbols are), or, how distributed the noise symbols are within the second set of symbols.

Example measurements of spread include calculating a greatest distance between respective positions of subsequent ones of the first set of symbols within the second set of symbols (or vice versa). For example, if the synchronization symbol sequence is an encoding of the string "pass" and the received symbols are encodings of the string 'p1a2s3s4', the measurement of spread would be 1. In these examples, the system may require a minimum measure of spread—e.g., that the greatest distance between respective positions of subsequent ones of the second subset of symbols within the second set of symbols be less than a threshold. In other examples, the measurement of spread may be an average distance between respective positions of subsequent ones of the first or second subset of symbols within the second set of symbols. In yet other examples, the measurement of spread may be a variance of the respective positions of the first or second sets of symbols. In still other examples, the measurement of spread may be a standard deviation of the respective positions of the first or second sets of symbols.

In some examples, the threshold range for the measurement of spread may be an upper threshold, a lower threshold, or an upper and a lower threshold. The thresholds may be specified or may be derived. For example, the thresholds may be derived from a length of the synchronization symbol sequence. For example, a higher level of spread may be required for shorter synchronization symbol sequences (to increase security) than longer synchronization symbol sequences, or vice versa. In some examples, both an upper bound and a lower bound ensures that the noise symbols are noisy—that is, they do not conform to an easy to decipher pattern. For example, a case where the synchronization symbol sequence is an encoding of the string "pass" and the received second set of symbols is an encoding of "p1a2s3s4" may be less secure than the received second set of symbols being an encoding of "p12as22s" because the every-other-symbol insertion of noise symbols in the former may be more predictable than the more random insertion in the latter. By requiring the spread to be higher than a minimum, but not a perfect spread, the system may require more randomness.

If at operation 745, the measure of spread is not within the threshold range, then at operation 760 the device may continue searching for synchronization symbol sequences. If at operation 745, the measure of spread is within the threshold range, then at operation 750, the computing device may perform one or more synchronization actions as described elsewhere herein.

In an example, a measure of spread of noise symbols in a synchronization symbol sequence within a set of entered symbols may be determined by creating a set of vectors of the received symbols. The set of vectors may be generated as described herein, such as described for operation 730. A distance metric from one or more of the set of vectors to vectors of the synchronization symbol sequence may be compared. In an example, an average, a median, or a total vector distance may be evaluated and compared to a threshold. When the average, median, or total distance transgresses the threshold, the set of entered symbols may be determined to have sufficient spread. In another example, a subset of the set of vectors may be used (e.g., only vectors that are between two thresholds, a "close" threshold and a "far" threshold may be used), and the subset may be required to have a minimum number of vectors.

In yet another example, the subset of vectors may be generated by taking sequential, in-order symbols of a total length equal to the synchronization symbol sequence (without skipping symbols). For example, the synchronization symbol sequence may be an encoding of a string "pass," and the received symbols may be an encoding of the string "p #arss," which is an example with noise sufficiently spread throughout. The set of vectors may be constructed in this example to be "p #ar", "#ars", and "arss." None of these are particularly close, distance-wise to "pass". An example of entered symbols having insufficient spread would be "#rpass." In this example, the set of vectors may include "#rpa", "rpas", and "pass." These vectors are closer in distance to the synchronization symbol sequence (including the synchronization symbol sequence itself), thus the entered symbols may be determined to have insufficient spread.

Figure 8:
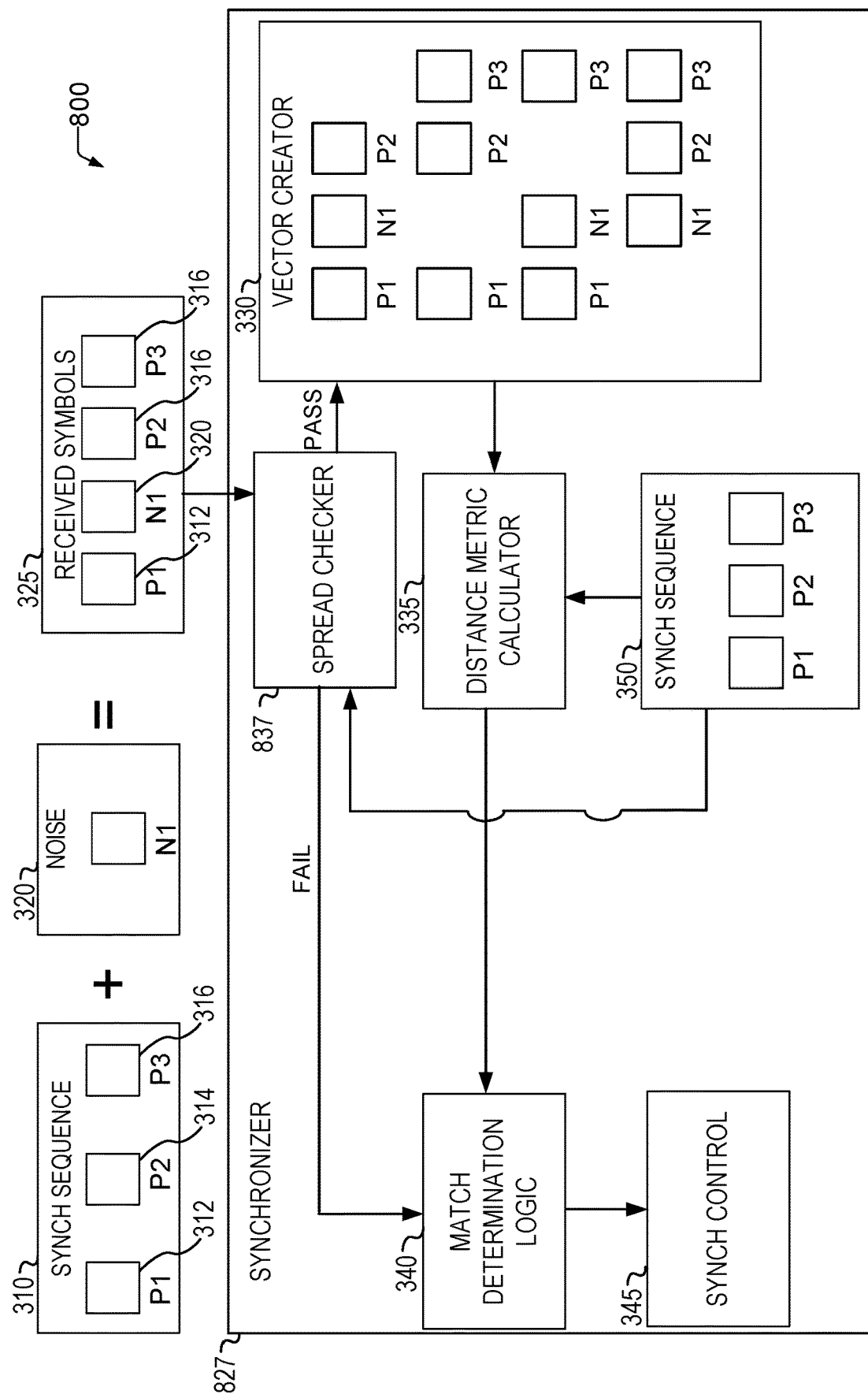
FIG. 8 illustrates a diagram of a data flow of a synchronization with additional, unspecified noise symbols according to some examples of the present disclosure.

FIG. 8 illustrates a diagram of a data flow 800 of a synchronization with additional, unspecified noise symbols according to some examples of the present disclosure. FIG. 8 is similar to FIG. 3, except in FIG. 8, the synchronizer 827 includes a spread checker 837. Spread checker 837 may calculate a measure of spread that quantifies how well distributed the intentionally inserted noise symbols 320 are within the received symbols 325 (or how well distributed the synchronization symbol sequences are within the received symbols 325). Spread checker 837 may be included in synchronizer 827, which may be an embodiment of synchronizer 120 in a transmitting computing device 110, and/or synchronizer 135 of receiving computing device 112 as shown in FIG. 1.

Spread checker 837 may calculate a spread of either the noise symbols 320 within the total received symbols 325 or the synchronization symbol sequences 312, 314, and 316 within the received symbols 325. As noted previously, example measurements of spread include calculating a greatest or average distance between synchronization symbol sequence or noise symbols, a variance, a standard deviation, or the like.

Spread checker 837 may compare the calculated spread to determine whether the measure of spread meets a specified one or more criteria. For example, the criteria may be whether the measure of spread is above a first threshold. In other examples, the criteria may be whether the measure of spread is below a second threshold. In yet other examples, the criteria may be whether the measure of spread is both above a first threshold and below a second threshold (and thus in a desired range). If the result is that the measure of spread of the received symbols 325 meets the criteria, then processing continues to vector creation with vector creator 330. If the measure of spread does not meet the criteria, then the determination may be made by match determination logic 340 that synchronization has failed or the search for the synchronization symbol sequence should continue. The remaining components of FIG. 8 are as described in FIG. 3.

Duplicate Entry Prevention

In some examples, a malicious actor may utilize a replay attack whereby the entire received symbol sequence is captured as it travels over the network from the transmitting computing device 110 to the receiving computing device 112 and later "replayed" in its entirety, including the noise symbols. To prevent this, in some examples, the system may take measures to detect and reject synchronization attempts that are identical or similar to past synchronization attempts.

For example, the synchronizer may store the received symbols for a plurality of past synchronization attempts. When a new synchronization attempt is made, the newly received symbols are compared to stored received symbols for past synchronization attempts. If the newly received symbols for the current synchronization attempt match or are within a specified threshold level of similarity of (to prevent simple changes) one of the stored past received symbol sequences for past synchronization attempts, the system may not synchronize. The system may store the received symbols for the plurality of past synchronization attempts for a specified time period (e.g., the last day, last week, last month, and the like), a specified number of synchronization attempts, or the like.

In other examples, instead of storing past received symbols, the system may store one or more of the distance metrics or measurements of spread of past synchronization attempts. For example, the system may store the two or three closest distance metrics for each synchronization attempt. If one or more distance metrics and/or spread measurements of a current synchronization attempt are within a threshold difference of one or more distance metrics and/or spread measurements of past synchronization attempts, then the present synchronization attempt may be rejected. By storing the distance metrics or spread measurements instead of the received symbols, the system may reduce the amount of storage needed to prevent replay attacks.

Partial Sequence Subset

In some examples, an eavesdropper may have access to the synchronization communications over multiple synchronization attempts. For example, by using man-in-the middle attacks an attacker may be able to discern a synchronization symbol sequence by detecting common symbols across multiple synchronization attempts. Even if the system enforces a random-like distribution of noise symbols in the synchronization symbol sequence, sophisticated algorithms may find patterns in the captured data.

To prevent this, the system may utilize a subset of the synchronization symbol sequence. For example, the synchronization symbol sequence may have values of "123456789" and the device may synchronize with "123," "4567," "6789," or the like. In some systems, with the synchronization symbol sequence as "123456789" other combinations such as "1345" or "1678" may be used (e.g., in a same order as symbols in "123456789", but not necessarily sequential). In some examples, the system may require the transmitting device to use a different synchronization symbol sequence subset each synchronization attempt. This makes it more difficult for eavesdroppers to observe the synchronization symbol sequence by detecting common symbols (e.g., symbols) across multiple synchronization attempts. In an example, the different synchronization symbol sequence subset may be repeated after a number of non-uses or a period of time (e.g., after 20 different subsets, a first entered subset may be repeated or after six months an already entered subset may be repeated).

The system may enforce a minimum and/or maximum subset length (e.g., the subset meets a minimum number of symbols, a minimum percentage of the total synchronization symbol sequence, or the like). The system may enforce a rule that a same subset may only be used a specified number of times over a specified number of synchronization attempts (or a specified time period). For example, a same synchronization symbol sequence subset may only be used twice over ten synchronization attempts. In some examples, the subset may be required to be comprised of contiguous symbols, but in other examples, skipping of symbols may be allowed. In some examples, the subset must be in order. That is, if the synchronization symbol sequence is "123456," the subset "13456" is a valid subset, but "6543" is not.

The present disclosure thus solves a technical problem of providing secure synchronization using a secure synchronization symbol sequence that is resistant to man-in-the middle and replay attacks. This is accomplished through the introduction of purposefully introduced random noise symbols. The synchronizing device decomposes the received symbols into a plurality of vectors and utilizes a distance metric to determine if synchronization has been achieved. By utilizing synchronization symbol sequence subsets in addition to noise symbols, the system may make it more difficult for attackers that are eavesdropping on the devices to ascertain the synchronization symbol sequence.

Figure 9:
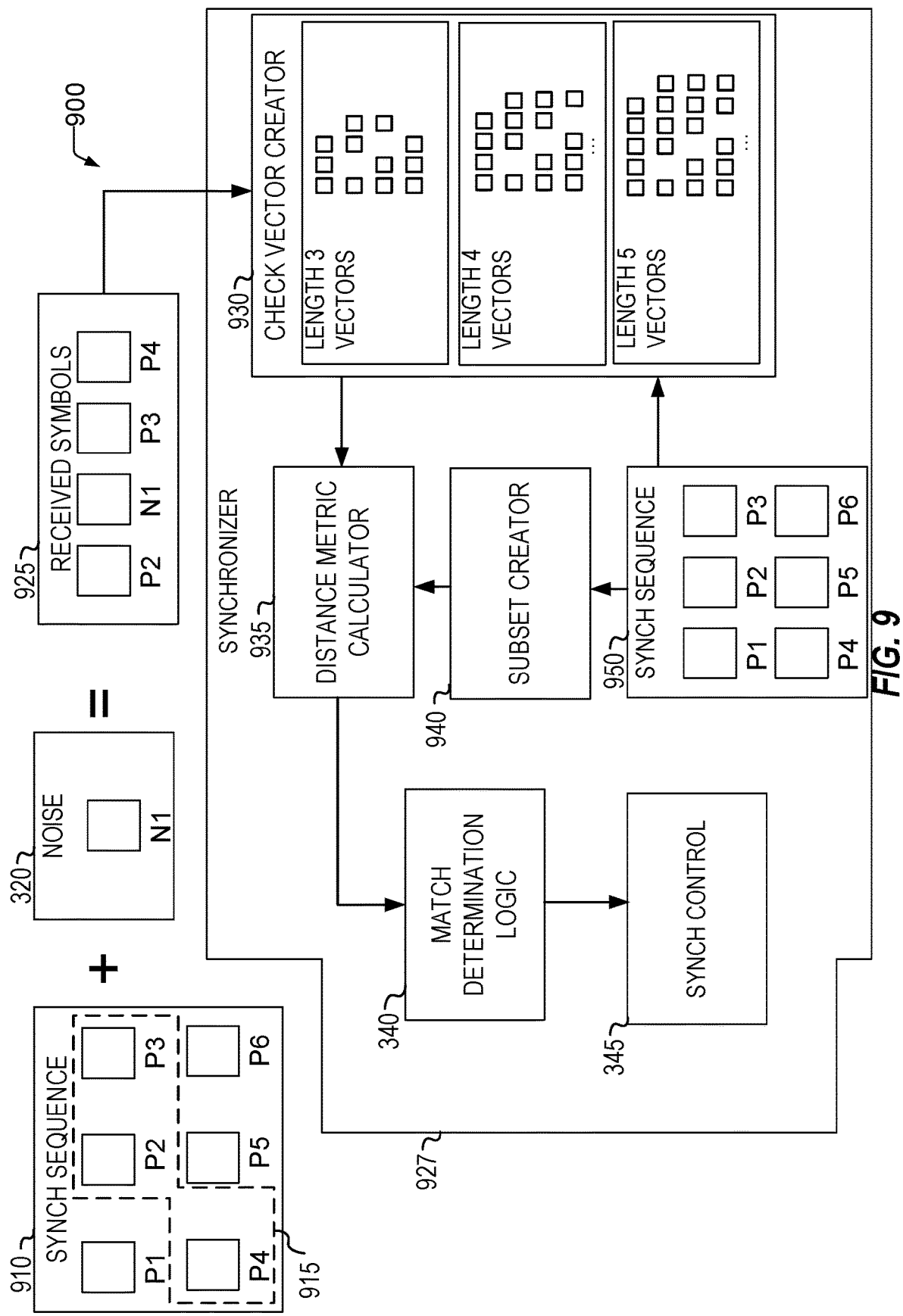
FIG. 9 illustrates a diagram of a data flow of a synchronization attempt with additional, unspecified noise symbols and enforced synchronization symbol sequence subsets according to some examples of the present disclosure.
Figure 13:
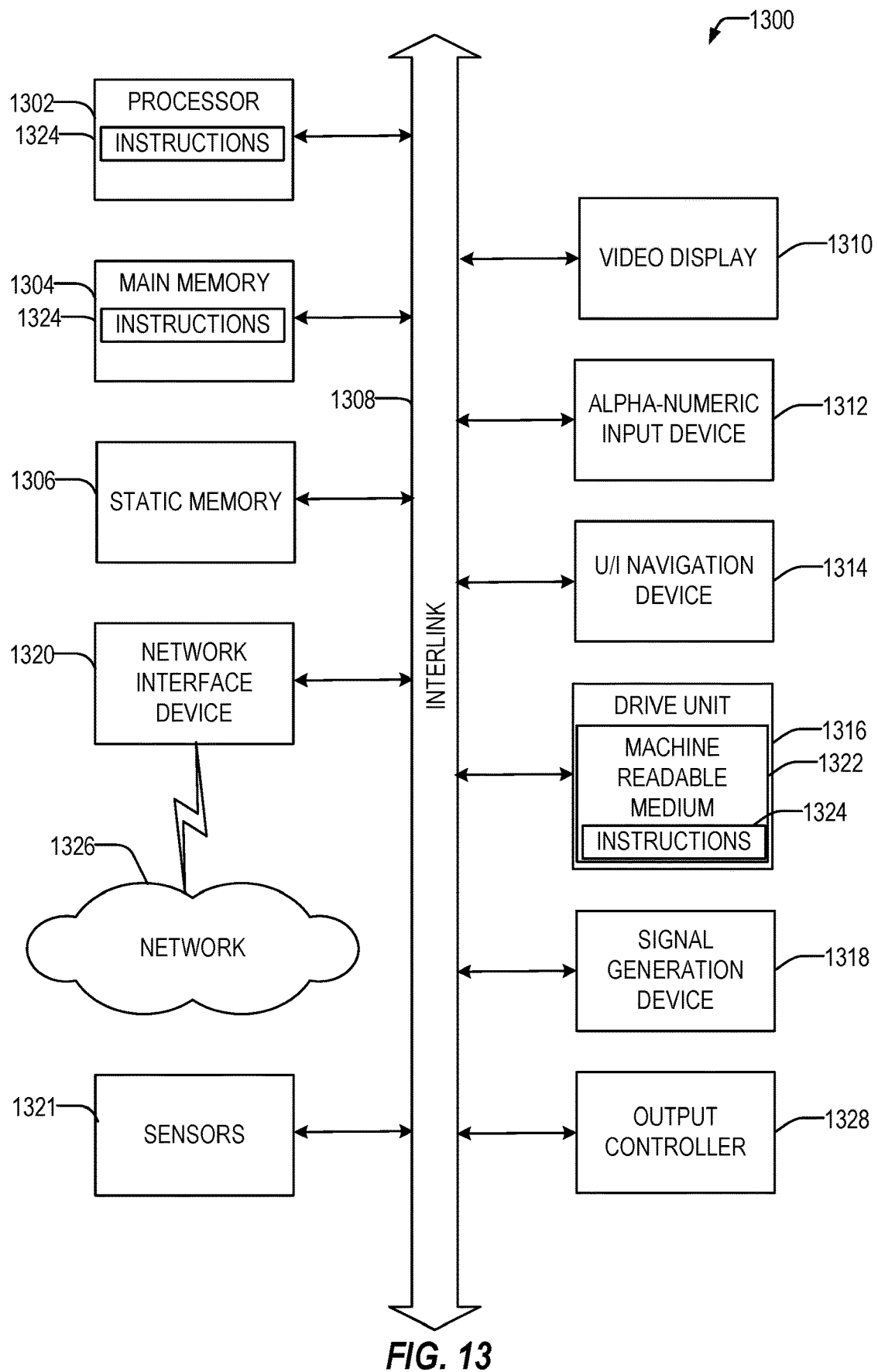
FIG. 13 illustrates a block diagram of an example machine which may implement one or more of the techniques (e.g., methodologies) discussed herein according to some examples of the present disclosure.

FIG. 9 illustrates a diagram of a data flow 900 of a synchronization attempt with additional, unspecified noise symbols and enforced synchronization symbol sequence subsets according to some examples of the present disclosure. The synchronization symbol sequence 910 may comprise six symbols in the form of symbols P1-P6. In the example of FIG. 13, the device has selected P2, P3, and P4 as subset synchronization symbol sequences 915. The device, when transmitting the synchronization symbol sequence adds one or more noise symbols 320 (e.g., symbols) to the subset. In the example shown in FIG. 9, for ease of description, only one noise symbol 320 is added. The received symbols 925 includes the subset synchronization symbol sequences 915 along with the one or more noise symbols 320 interspersed into the synchronization symbol sequence symbols.

The synchronizer 927 includes a subset creator 940 that identifies a plurality of ordered vectors (called synchronization symbol sequence subset vectors) comprising ordered subsets of the expected synchronization symbol sequence 950. In examples in which subsets must be of a minimum number of symbols, the subset creator 940 creates synchronization symbol sequence subset vectors of the minimum size and greater (up to either the size of the expected synchronization symbol sequence 950 or a maximum subset size). For example, if the minimum size is five symbols, then each of the synchronization symbol sequence subset vectors is five or more symbols and the synchronization symbol sequence subset vectors comprise a set of all possible subsets of the expected synchronization symbol sequence 950 of five or more symbols (optionally as a strict subset, e.g., not including the expected synchronization symbol sequence 950 in its entirety).

Check vector creator 930 receives the received symbols 925 and creates a plurality of sets of vectors from the received symbols 925, each set having a length corresponding to a length of a synchronization symbol sequence subset vector created by the subset creator 940. These vectors may be called "check vectors." The plurality of check vectors reflects each of the possible length m in-order, combinations of the received symbols 925, where m are valid subset lengths of the expected synchronization symbol sequence. The order of the symbols in each of the check vectors is a same order as an order of the synchronization symbol sequences in the received symbols 925. As shown in FIG. 9, m are vectors of length three, four, and five vectors. The length three vectors are all possible in-order combinations of the received symbols 925 of length three. The length four vectors are all possible in-order combinations of the received symbols 925 of length four. The length five vectors are all possible in-order combinations of the received symbols 925 of length five, and so on. In other examples, m may be different lengths. For example, a device may send a synchronization symbol sequence length with the received symbols 925. The check vectors may be created with lengths between the minimum subset length and the maximum subset length.

The check vectors and the synchronization symbol sequence subset vectors are passed to a distance metric calculator 935 that calculates a distance between each combination of the synchronization symbol sequence subset vectors and each of the plurality of check vectors. In other examples, distance metric calculator 935 calculates a distance between each same-sized combination of the synchronization symbol sequence subset vectors and each of the plurality of check vectors. For example, length five check vectors may be compared with length 5 synchronization symbol sequence subset vectors.

In some examples, the distance metric may be a Levenshtein distance. In other examples, a distance metric may compare each symbol of each check vector to the corresponding symbol of each synchronization symbol sequence subset vector. If the symbols match, then the score may not be incremented. If the symbols do not match, the score may be incremented. In other examples, a higher score reflects a better match and thus symbols that match may cause the score to be incremented and symbols that do not match may cause no change in the score or may cause the score to be decremented. In still other examples, the distance metric may be a correlation, such as a Pearson correlation coefficient.

The distance metrics are then passed to the match determination logic 340. In some examples, the match determination logic 340 identifies the distance metric that signifies a closest match between a check vector and one of the synchronization symbol sequence subset vectors (e.g., a smallest distance). This may be a highest score (in the case of assigning points for a match), or may be a lowest score, depending on the implementation desired. If the distance metric that signifies the closest match is closer to one of the synchronization symbol sequence subset vectors than a threshold value (e.g., the distance is smaller than a threshold), then the match determination logic 340 may return that a match is found. In other examples, the match determination logic identifies two distance metrics that signify the two closest matches with the synchronization symbol sequence subset vectors (e.g., a smallest distance and a second smallest distance). The match determination logic 340 may then take the ratio of the two distance metrics and compare that to a threshold to determine whether there is a match. Synchronization control 345 may then perform one or more synchronization actions if the match determination logic determines that a match has been found.

In some examples, the check vector creator 930 may verify that the received symbols 925 includes a subset, but not all the expected synchronization symbol sequence 950. For example, the check vector creator 930 may determine a count of the number of the symbols in the received symbols that match, in order, symbols from the synchronization symbol sequence. In some examples, the check vector creator 930 may ensure this is within an acceptable range. For example, the check vector creator 930 may compare this number of symbols to a minimum threshold (to ensure a minimum subset size) and a maximum threshold (to ensure that the subset is not too close to the entire synchronization symbol sequence). If the number of symbols is within this range, the check vector creator 930 may determine that synchronization proceeds. If the number of symbols is not within the range, the check vector creator 930 may cause synchronization to fail.

In some examples, the presence of a subset (and not the entire synchronization symbol sequence) may be determined by verifying that the check vector with the closest distance metric to any of the synchronization symbol sequence subset vectors is within a desired threshold distance range to the entire expected synchronization symbol sequence 950. The range may enforce a minimum closeness and a maximum closeness. This ensures that the subset is complete enough to constitute a synchronization, but not the entire (or almost entire) synchronization symbol sequence. In some examples, the minimum subset length may increase as the synchronization symbol sequence length increases until a defined maximum, at which point longer synchronization symbol sequence lengths do not increase the minimum subset length.

In yet another example, a ratio of the distance of the vector with a closest distance and the distance of the vector with a next closest distance may be compared to a minimum threshold. In this example, the system may also enforce a maximum threshold on the distance of the vector with the closest distance. In this example, a hybrid of thresholds is used to enforce the minimum and maximum, with the minimum threshold used on the ratio and the maximum threshold used on the distance itself.

In some examples, the check vector creator 930 may enforce duplicate entry restrictions such that that synchronization symbol sequence subsets that are sent are compared across synchronization attempts to determine if a transmitting device is utilizing a same subset frequently (e.g., over a threshold occurrence). If the transmitting device's use of a particular subset transgresses a threshold rate of occurrence, the synchronizer 927 may reject the synchronization attempt. In some examples, the rate of occurrence may be defined as a number of usages over a specified amount of time (e.g., the past day, week, month) or as a specified number of synchronization attempts.

In some examples, the threshold frequency may be based on a length of the expected synchronization symbol sequence 950. For example, depending on the length of the expected synchronization symbol sequence 950, there may only be x number of valid subsets of a minimum length l. In some examples, the threshold frequency may be set based on x, such as x divided by 2, or x, or x–a configurable or specified margin.

In some examples, in addition to enforcing a requirement of a different subset, the check vector creator 930 may enforce a requirement that the noise symbols 320 may be different or be interspersed in different locations of the entered synchronization symbol sequences 910 across multiple synchronization attempts.

Figure 10:
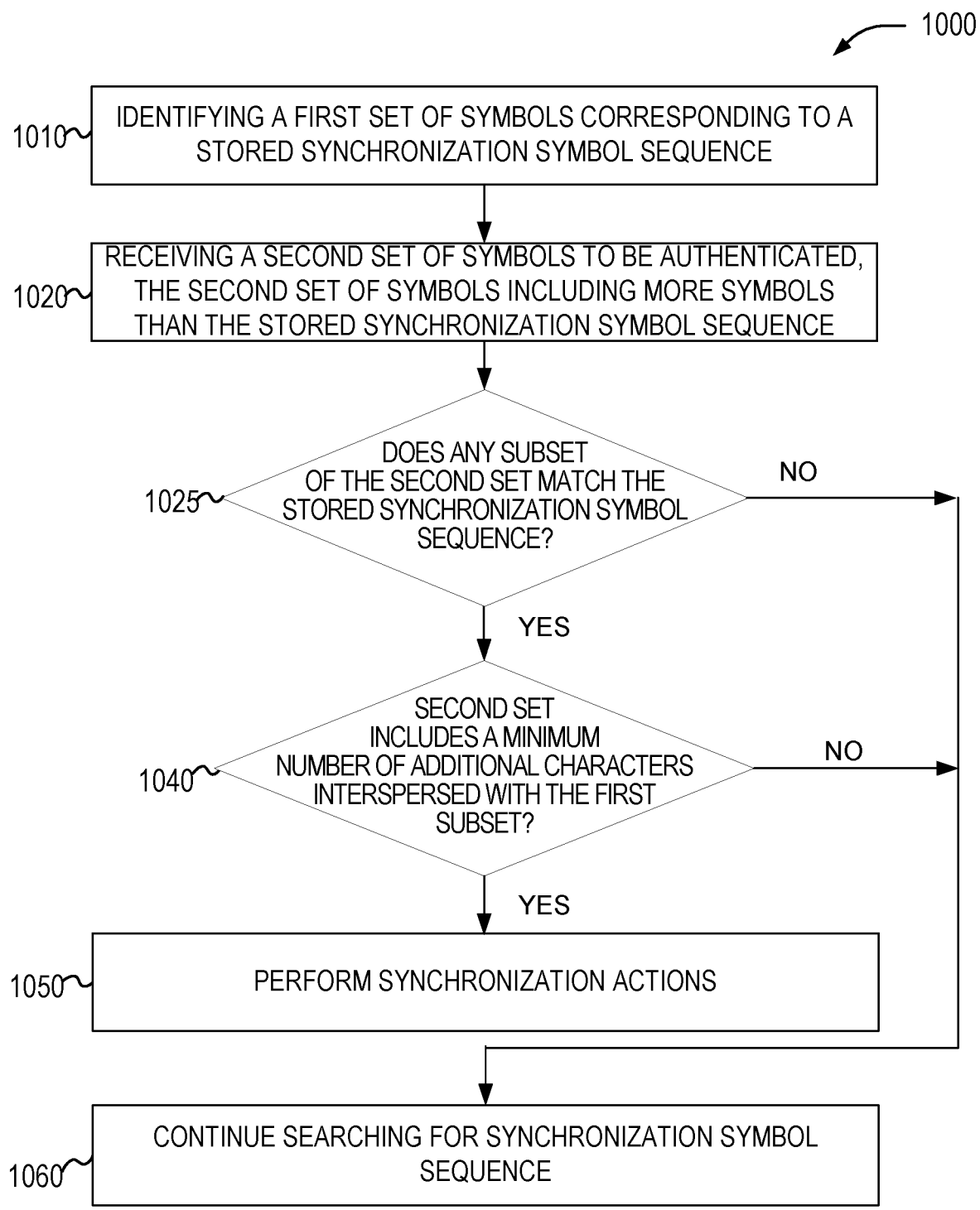
FIG. 10 illustrates a flowchart of a method of synchronizing a device using a synchronization symbol sequence subset according to some examples of the present disclosure.

FIG. 10 illustrates a flowchart of a method 1000 of synchronizing a device using a synchronization symbol sequence subset according to some examples of the present disclosure. At operation 1010 the synchronizer identifies a first set of symbols corresponding to an expected synchronization symbol sequence, such as a synchronization symbol sequence. At operation 1020, the synchronizer receives a second set of symbols to be compared with the expected synchronization symbol sequence, the second set of symbols may include more symbols than the first set of symbols. For example, the symbols may be entered synchronization symbol sequence symbols.

At operation 1025, the synchronizer may determine if any subset of the second set of symbols matches the symbols of the expected synchronization symbol sequence. For example, the synchronizer may determine a plurality of ordered vectors (the synchronization symbol sequence subset vectors) comprising ordered subsets of the expected synchronization symbol sequence of all possible lengths greater than a minimum subset length. For example, if the expected synchronization symbol sequence is an encoding of the string "password" and the minimum subset length is three (in some examples, skipping symbols is not allowed, but other examples may allow for skipping, such as "pwd" in this example) the synchronization symbol sequence subset vectors would be all possible in-order subsets of three, four, five, six, and seven, and eight symbols. In some examples, a maximum subset size may also be specified. In these examples, the synchronization symbol sequence subset vectors may be limited to a maximum size to enforce the requirement that the synchronization symbol sequence entered be a subset (and not the entire synchronization symbol sequence). The maximum size may be specified (e.g., by an administrator) or may be calculated based on the size of the synchronization symbol sequence. In the above example where the synchronization symbol sequence is an encoding of the string "password," if the maximum subset size limit is six, then the synchronization symbol sequence subset vectors would be all possible in-order subsets of three, four, five, and six symbols (examples below shown where skipping is prevented for ease of readability):

3: pas;ass;ssw;swo;wor;ord;
4: pass;assw;sswo;swor;word;
5: passw;asswo;sswor;sword;
6: passwo;asswor;ssword;

The synchronizer then creates a plurality of vectors (check vectors) from the second set of symbols, each vector having a length corresponding to a length of a corresponding synchronization symbol sequence subset vector. The check vectors reflect each of the possible in-order, combinations of the second set of symbols of a length corresponding to the length of a corresponding synchronization symbol sequence subset vector. For example, if there are four sets of synchronization symbol sequence subset vectors, with respective lengths of 3, 4, 5, and 6 symbols, then a first plurality of check vectors are created with all possible three symbol long, in-order combinations of the second set of symbols; a second plurality of check vectors are created with all possible four symbol long, in-order combinations of the second set of symbols; a third plurality of check vectors are created with all possible five symbol long, in-order combinations of the second set of symbols; and a fourth plurality of check vectors are created with all possible six symbol long, in-order combinations of the second set of symbols. By in-order, it is meant that an order of the symbols in each of the check vectors is a same order as an order of the symbols in the second set of symbols.

In some examples, a distance between each of the synchronization symbol sequence subset vectors of a particular length and each of the plurality of check vectors of a same particular length is calculated. The distance quantifies a difference between each check vector and each synchronization symbol sequence subset vector. In other examples, a distance between each combination (regardless of size) of the synchronization symbol sequence subset vectors and each of the plurality of check vectors is calculated.

The synchronizer then determines if the second set of symbols includes a first subset of symbols matching a portion of the expected synchronization symbol sequence. For example, the synchronizer determines if the second set of symbols includes a subset of the expected synchronization symbol sequence (e.g., synchronization symbol sequence). In some examples, to determine whether the second set of symbols includes the first subset matching a portion of the expected synchronization symbol sequence, the system may utilize the distance metrics and whether at least one of the distance metrics is within a threshold distance of the synchronization symbol sequence subset vectors. If the second set of symbols does not include a subset of the expected synchronization symbol sequence, then at operation 1060, the device may continue searching for a synchronization symbol sequence—e.g., in additional packets or in a new part or portion of a bitstream. If the second set of symbols includes a subset of the expected synchronization symbol sequence, then processing moves to operation 1040.

At operation 1040, the synchronizer determines whether the second set of symbols includes a second subset of unspecified symbols in one or more unspecified positions within the second set of symbols. For example, the synchronizer determines whether noise symbols are added to the synchronization symbol sequence. In some examples, the synchronizer may ensure that additional symbols are entered to ensure that the synchronization sequence symbols are secured from eavesdropping attacks. If there are no additional noise symbols added, then at operation 1060 the device may continue searching for a synchronization symbol sequence (as the current synchronization attempt has failed). Otherwise, one or more synchronization actions or operations may be performed at operation 1050. It is noted that the synchronizer does not specify for any synchronization attempt where the noise symbols are to be placed, and what the noise symbols are. This protects the devices by preventing eavesdropping of these locations.

Figure 11:
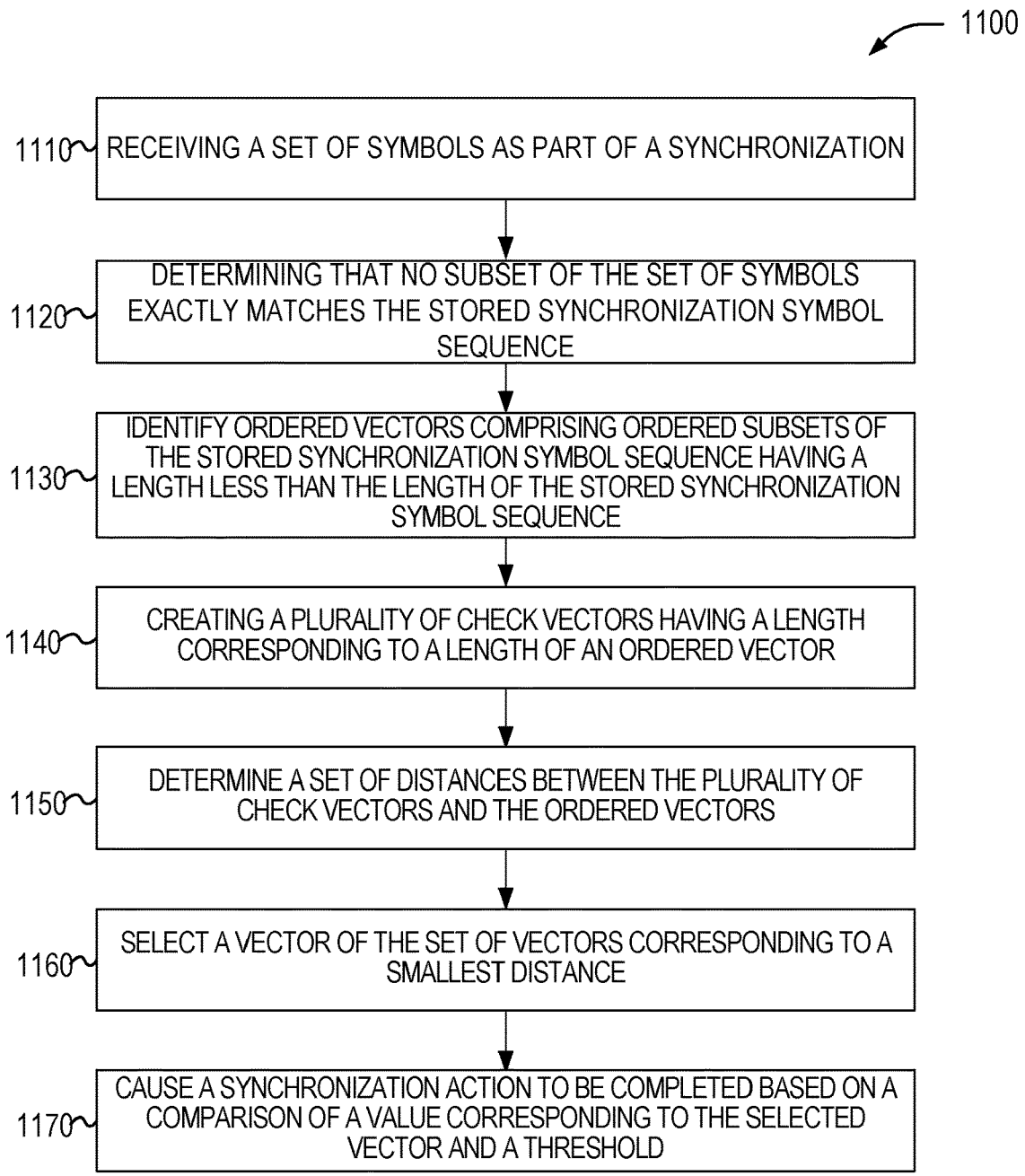
FIG. 11 illustrates a flowchart of a method of synchronizing a device according to some examples of the present disclosure.

FIG. 11 illustrates a flowchart of a method 1100 of synchronizing a device according to some examples of the present disclosure. At operation 1110 the synchronizer may receive a set of symbols as part of a synchronization attempt. At operation 1120, the synchronizer determines that no subset of the set of received symbols exactly matches an expected synchronization symbol sequence. This ensures that the entered synchronization symbol sequence is a subset and not the entire synchronization symbol sequence. If there is a subset of the received set of symbols that exactly matches the expected synchronization symbol sequence, in some examples, synchronization may fail.

At operation 1130, the synchronizer may identify ordered vectors comprising ordered subsets of the expected synchronization symbol sequence having a length less than the length of the expected synchronization symbol sequence (e.g., the synchronization symbol sequence subset vectors). At operation 1140, the synchronizer creates a plurality of check vectors having lengths corresponding to the lengths of the synchronization symbol sequence subset vectors. At operation 1150, the synchronizer may determine a set of distances between the plurality of check vectors and the synchronization symbol sequence subset vectors. As noted, in some examples, the set of distances comprises distances between each combination of check vectors and synchronization symbol sequence subset vectors, but in other examples, the set of distances comprises only distances between each combination of same-sized check vectors and synchronization symbol sequence subset vectors (e.g., check vectors of size z and synchronization symbol sequence subset vectors of size z).

At operation 1160 the synchronizer may select a check vector corresponding to a smallest distance. At operation 1170, the synchronizer may cause a synchronization action to be performed based on a comparison of a value corresponding to the selected vector and a threshold. For example, the smallest distance value corresponding to the selected vector and the threshold. In other examples, a ratio of the smallest distance corresponding to the selected vector and a second smallest distance corresponding to the selected vector or a second check vector may be compared with a threshold.

Figure 12:
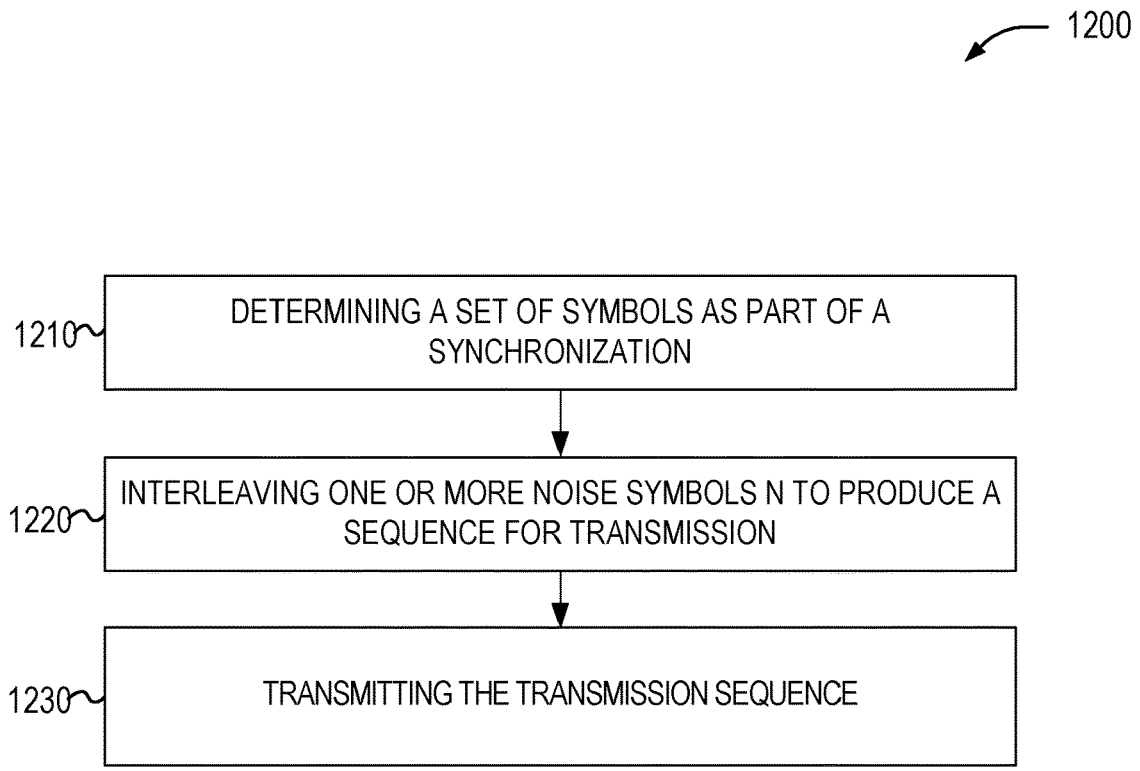
FIG. 12 illustrates an example of a method for transmitting a synchronization sequence according to some examples of the present disclosure.

FIG. 12 illustrates an example of a method 1200 for transmitting a synchronization sequence according to some examples of the present disclosure. The method of FIG. 12 may be performed by a transmitting computing device and includes the intentional addition of noise symbols. At operation 1210, the computing device may determine a set of symbols. For example, the computing device may retrieve the expected synchronization symbol sequence from a storage device, from memory, or the like. In some examples, the computing device may, at operation 1210, determine the synchronization sequence, e.g., from one or more of the transmitting and receiving device identifiers. In examples in which a subset of the stored synchronization sequence is used, the transmitter may determine a subset of the stored synchronization sequence. In some examples, the transmitter may store one or more indicators of past subsets sent if the receiver prohibits duplicate sub sets.

At operation 1220, the transmitting computing device may interleave one or more noise symbols N to produce a sequence for transmission. In some examples in which the system utilizes spread requirements the transmitting device may interleave one or more of the noise symbols so as to meet the requirements of the measurement of spread. In examples in which the system prohibits repeated noise symbols, or repeated spread symbols the transmitting device may store one or more indications of past noise symbols or past measurements of spread so as to ensure that the synchronization is not rejected. In addition, the transmitting device may ensure that any other requirements described herein have been met.

At operation 1230 the transmitting device may transmit the transmission sequence including both the synchronization symbols determined at operation 1210 and the noise symbols determined at operation 1220. In some examples, this transmission may be part of a data transmission. In other examples, the synchronization transmission may wake up the receiving device from a low power state. In some examples, the transmitting device may send and/or receive data to the receiving device after successful synchronization.

In some examples, the various features described above may be implemented alone, or in combination. For example, the system may require noise symbols, enforce a maximum number of total symbols, require a subset, require a noise character distribution that is within a range of measurement of spread, and require that the received symbols not be duplicated. In other examples, only certain features may be implemented, and others may not be implemented. In yet other examples, the features and requirements implemented may be configurable by an end user, an administrator, system designer, or the like. In addition, in various flowcharts, the order of operations may be exemplary. For example, in FIG. 4, operations 1025 and 1040 may be performed in any order depending on the implementation. This is but one example as other flowcharts may be reordered according to a desired implementation. As used herein, an IoT device are non-standard computing devices that connect to a network and transmit and/or receive data. Examples may include smart televisions, smart appliances, smart thermostats, smart controllers, supervisory control and data acquisition (SCADA) devices, smart home devices, and the like.

FIG. 13 illustrates a block diagram of an example machine 1300 which may implement one or more of the techniques (e.g., methodologies) discussed herein according to some examples of the present disclosure. In alternative embodiments, the machine 1300 may operate as a stand-alone device or may be connected (e.g., networked) to other machines. In a networked deployment, the machine 1300 may operate in the capacity of a server machine, a client machine, or both in server-client network environments. Machine 1300 may implement a transmitting computing device 110, a receiving computing device 112, a transmitting computing device, a receiving computing device, and the like. For example, the machine 1300 may be configured to include any one or more of the components of FIGS. 3,8, and 9. The machine 1300 may be configured to perform the methods of FIGS. 4-7 and 10-12. In an example, the machine 1300 may act as a peer machine in peer-to-peer (P2P) (or other distributed) network environment. The machine 1300 may be a user device, a remote device, a second remote device or other device which may take the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The machine 1300 may additionally include a storage device (e.g., drive unit) 1316, a signal generation device 1318 (e.g., a speaker), a network interface device 1320, and one or more sensors 1321, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine readable media.

While the machine readable medium 1322 is illustrated as a single medium, the term "machine readable medium" may include a single medium or multiple media (e.g., a centralized or distributed database, and/or associated caches and servers) configured to store the one or more instructions 1324.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may be non-transitory machine readable media. In some examples, machine readable media may include machine readable media that is not a transitory propagating signal.

The instructions 1324 may further be transmitted or received over a communications network 1326 using a transmission medium via the network interface device 1320. The Machine 1300 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. In some examples, the network interface device 1320 may wirelessly communicate using Multiple User MIMO techniques.

Non Limiting Examples

Example 1 is a method for synchronization, the method comprising: using one or more hardware processors of a first device: identifying a first set of symbols corresponding to a synchronization sequence, the first set of symbols having a first number of symbols; receiving, over a signal channel, a second set of symbols from a second device, the second set of symbols including a second number of symbols, the second number being greater than the first number; comparing at least one subset of the second set of symbols with the first set of symbols to determine a comparison result, the at least one subset having the first number of symbols, the at least one subset skipping at least one symbol that is between at least two other symbols of the second set of symbols that are included in the at least one subset; determining that the comparison result meets a specified condition; and responsive to determining that the comparison result meets the specified condition, executing an action corresponding to the synchronization sequence.

In Example 2, the subject matter of Example 1 includes, wherein the comparison result is an indication of whether there is a perfect match between the first set of symbols and the at least one subset of the received second set of symbols and wherein determining that the comparison result meets a specified condition comprises determining that the indication is a perfect match.

In Example 3, the subject matter of Examples 1-2 includes, wherein the comparison result is a correlation between the first set of symbols and the at least one subset of the received second set of symbols and wherein determining that the comparison result meets a specified condition comprises determining that the correlation is above a specified threshold.

In Example 4, the subject matter of Examples 1-3 includes, wherein executing the action corresponding to the synchronization sequence comprises waking up the first device from a low-power state.

In Example 5, the subject matter of Examples 1-4 includes, wherein executing the action corresponding to the synchronization sequence comprises aligning a symbol boundary based upon the at least one subset.

In Example 6, the subject matter of Examples 1-5 includes, wherein the comparison result is a distance metric, and wherein the method further comprises: comparing a second subset of the received second set of symbols with the first set of symbols to determine a second comparison result, the second subset having the first number of symbols; determining that the comparison result indicates a shorter distance than the second comparison result; and wherein determining that the comparison result meets a specified condition comprises determining that the comparison result indicates a distance shorter than a specified threshold.

In Example 7, the subject matter of Examples 1-6 includes, wherein at least one noise symbol is intentionally interspersed with the synchronization sequence in the second set of symbols by the second device.

In Example 8, the subject matter of Examples 1-7 includes, wherein at least one noise symbol is interspersed with the synchronization sequence in the second set of symbols by the signal channel.

In Example 9, the subject matter of Examples 1-8 includes, wherein the method is performed by an Internet of Things (IoT) device.

Example 10 is a device capable of synchronization, the device comprising: a hardware processor; a memory, storing instructions which when executed by the hardware processor, cause the device to perform operations comprising: identifying a first set of symbols corresponding to a synchronization sequence, the first set of symbols having a first number of symbols; receiving, over a signal channel, a second set of symbols from a second device, the second set of symbols including a second number of symbols, the second number being greater than the first number; comparing at least one subset of the second set of symbols with the first set of symbols to determine a comparison result, the at least one subset having the first number of symbols, the at least one subset skipping at least one symbol that is between at least two other symbols of the second set of symbols that are included in the at least one subset; determining that the comparison result meets a specified condition; and responsive to determining that the comparison result meets the specified condition, executing an action corresponding to the synchronization sequence.

In Example 11, the subject matter of Example 10 includes, wherein the comparison result is an indication of whether there is a perfect match between the first set of symbols and the at least one subset of the received second set of symbols and wherein the operations of determining that the comparison result meets a specified condition comprises determining that the indication is a perfect match.

In Example 12, the subject matter of Examples 10-11 includes, wherein the comparison result is a correlation between the first set of symbols and the at least one subset of the received second set of symbols and wherein the operations of determining that the comparison result meets a specified condition comprises determining that the correlation is above a specified threshold.

In Example 13, the subject matter of Examples 10-12 includes, wherein the operations of executing the action corresponding to the synchronization sequence comprises waking up the device from a low-power state.

In Example 14, the subject matter of Examples 10-13 includes, wherein the operations of executing the action corresponding to the synchronization sequence comprises aligning a symbol boundary based upon the at least one subset.

In Example 15, the subject matter of Examples 10-14 includes, wherein the comparison result is a distance metric, and wherein the operations further comprise: comparing a second subset of the received second set of symbols with the first set of symbols to determine a second comparison result, the second subset having the first number of symbols; determining that the comparison result indicates a shorter distance than the second comparison result; and wherein determining that the comparison result meets a specified condition comprises determining that the comparison result indicates a distance shorter than a specified threshold.

In Example 16, the subject matter of Examples 10-15 includes, wherein at least one noise symbol is intentionally interspersed with the synchronization sequence in the second set of symbols by the second device.

In Example 17, the subject matter of Examples 10-16 includes, wherein at least one noise symbol is interspersed with the synchronization sequence in the second set of symbols by the signal channel.

In Example 18, the subject matter of Examples 10-17 includes, wherein the device is an Internet of Things (IoT) device.

Example 19 is a machine-readable medium, storing instructions which when executed by a device, cause the device to perform operations comprising: identifying a first set of symbols corresponding to a synchronization sequence, the first set of symbols having a first number of symbols; receiving, over a signal channel, a second set of symbols from a second device, the second set of symbols including a second number of symbols, the second number being greater than the first number; comparing at least one subset of the second set of symbols with the first set of symbols to determine a comparison result, the at least one subset having the first number of symbols, the at least one subset skipping at least one symbol that is between at least two other symbols of the second set of symbols that are included in the at least one subset; determining that the comparison result meets a specified condition; and responsive to determining that the comparison result meets the specified condition, executing an action corresponding to the synchronization sequence.

In Example 20, the subject matter of Example 19 includes, wherein the comparison result is an indication of whether there is a perfect match between the first set of symbols and the at least one subset of the received second set of symbols and wherein the operations of determining that the comparison result meets a specified condition comprises determining that the indication is a perfect match.

In Example 21, the subject matter of Examples 19-20 includes, wherein the comparison result is a correlation between the first set of symbols and the at least one subset of the received second set of symbols and wherein the operations of determining that the comparison result meets a specified condition comprises determining that the correlation is above a specified threshold.

In Example 22, the subject matter of Examples 19-21 includes, wherein the operations of executing the action corresponding to the synchronization sequence comprises waking up the device from a low-power state.

In Example 23, the subject matter of Examples 19-22 includes, wherein the operations of executing the action corresponding to the synchronization sequence comprises aligning a symbol boundary based upon the at least one subset.

In Example 24, the subject matter of Examples 19-23 includes, wherein the comparison result is a distance metric, and wherein the operations further comprise: comparing a second subset of the received second set of symbols with the first set of symbols to determine a second comparison result, the second subset having the first number of symbols; determining that the comparison result indicates a shorter distance than the second comparison result; and wherein determining that the comparison result meets a specified condition comprises determining that the comparison result indicates a distance shorter than a specified threshold.

In Example 25, the subject matter of Examples 19-24 includes, wherein at least one noise symbol is intentionally interspersed with the synchronization sequence in the second set of symbols by the second device.

In Example 26, the subject matter of Examples 19-25 includes, wherein at least one noise symbol is interspersed with the synchronization sequence in the second set of symbols by the signal channel.

In Example 27, the subject matter of Examples 19-26 includes, wherein the device is an Internet of Things (IoT) device.

Example 28 is a device for synchronization, the device comprising: means for identifying a first set of symbols corresponding to a synchronization sequence, the first set of symbols having a first number of symbols; means for receiving, over a signal channel, a second set of symbols from a second device, the second set of symbols including a second number of symbols, the second number being greater than the first number; means for comparing at least one subset of the second set of symbols with the first set of symbols to determine a comparison result, the at least one subset having the first number of symbols, the at least one subset skipping at least one symbol that is between at least two other symbols of the second set of symbols that are included in the at least one subset; means for determining that the comparison result meets a specified condition; and responsive to determining that the comparison result meets the specified condition, means for executing an action corresponding to the synchronization sequence.

In Example 29, the subject matter of Example 28 includes, wherein the comparison result is an indication of whether there is a perfect match between the first set of symbols and the at least one subset of the received second set of symbols and wherein the means for determining that the comparison result meets a specified condition comprises means for determining that the indication is a perfect match.

In Example 30, the subject matter of Examples 28-29 includes, wherein the comparison result is a correlation between the first set of symbols and the at least one subset of the received second set of symbols and wherein the means for determining that the comparison result meets a specified condition comprises means for determining that the correlation is above a specified threshold.

In Example 31, the subject matter of Examples 28-30 includes, wherein executing the action corresponding to the synchronization sequence comprises waking up the device from a low-power state.

In Example 32, the subject matter of Examples 28-31 includes, wherein executing the action corresponding to the synchronization sequence comprises aligning a symbol boundary based upon the at least one subset.

In Example 33, the subject matter of Examples 28-32 includes, wherein the comparison result is a distance metric, and wherein the device further comprises: means for comparing a second subset of the received second set of symbols with the first set of symbols to determine a second comparison result, the second subset having the first number of symbols; means for determining that the comparison result indicates a shorter distance than the second comparison result; and wherein the means for determining that the comparison result meets a specified condition comprises means for determining that the comparison result indicates a distance shorter than a specified threshold.

In Example 34, the subject matter of Examples 28-33 includes, wherein at least one noise symbol is intentionally interspersed with the synchronization sequence in the second set of symbols by the second device.

In Example 35, the subject matter of Examples 28-34 includes, wherein at least one noise symbol is interspersed with the synchronization sequence in the second set of symbols by the signal channel.

In Example 36, the subject matter of Examples 28-35 includes, wherein the device is an Internet of Things (IoT) device.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36.

Example 39 is a system to implement of any of Examples 1-36.

Example 40 is a method to implement of any of Examples 1-36.

What is claimed is:

1. A method for synchronization, the method comprising:
using one or more hardware processors of a first device:
identifying a first set of symbols corresponding to a synchronization sequence, the first set of symbols having a first number of symbols;
receiving, over a signal channel, a second set of symbols from a second device, the second set of symbols including a second number of symbols, the second number being greater than the first number;
comparing at least one subset of the second set of symbols with the first set of symbols to determine a comparison result, the at least one subset having the first number of symbols, the at least one subset skipping at least one symbol that is between at least two other symbols of the second set of symbols that are included in the at least one subset;
determining that the comparison result meets a specified condition; and
responsive to determining that the comparison result meets the specified condition, executing an action corresponding to the synchronization sequence.

2. The method of claim 1, wherein the comparison result is an indication of whether there is a perfect match between the first set of symbols and the at least one subset of the received second set of symbols and wherein determining that the comparison result meets a specified condition comprises determining that the indication is a perfect match.

3. The method of claim 1, wherein the comparison result is a correlation between the first set of symbols and the at least one subset of the received second set of symbols and wherein determining that the comparison result meets a specified condition comprises determining that the correlation is above a specified threshold.

4. The method of claim 1, wherein executing the action corresponding to the synchronization sequence comprises waking up the first device from a low-power state.

5. The method of claim 1, wherein executing the action corresponding to the synchronization sequence comprises aligning a symbol boundary based upon the at least one subset.

6. The method of claim 1, wherein the comparison result is a distance metric, and wherein the method further comprises:
comparing a second subset of the received second set of symbols with the first set of symbols to determine a second comparison result, the second subset having the first number of symbols;
determining that the comparison result indicates a shorter distance than the second comparison result; and
wherein determining that the comparison result meets a specified condition comprises determining that the comparison result indicates a distance shorter than a specified threshold.

7. The method of claim 1, wherein at least one noise symbol is intentionally interspersed with the synchronization sequence in the second set of symbols by the second device.

8. The method of claim 1, wherein at least one noise symbol is interspersed with the synchronization sequence in the second set of symbols by the signal channel.

9. The method of claim 1, wherein the method is performed by an Internet of Things (IoT) device.

10. A device capable of synchronization, the device comprising:
a hardware processor;
a memory, storing instructions which when executed by the hardware processor, cause the device to perform operations comprising:
identifying a first set of symbols corresponding to a synchronization sequence, the first set of symbols having a first number of symbols;
receiving, over a signal channel, a second set of symbols from a second device, the second set of symbols including a second number of symbols, the second number being greater than the first number;
comparing at least one subset of the second set of symbols with the first set of symbols to determine a comparison result, the at least one subset having the first number of symbols, the at least one subset skipping at least one symbol that is between at least two other symbols of the second set of symbols that are included in the at least one subset;
determining that the comparison result meets a specified condition; and
responsive to determining that the comparison result meets the specified condition, executing an action corresponding to the synchronization sequence.

11. The device of claim 10, wherein the comparison result is an indication of whether there is a perfect match between the first set of symbols and the at least one subset of the received second set of symbols and wherein the operations of determining that the comparison result meets a specified condition comprises determining that the indication is a perfect match.

12. The device of claim 10, wherein the comparison result is a correlation between the first set of symbols and the at least one subset of the received second set of symbols and wherein the operations of determining that the comparison result meets a specified condition comprises determining that the correlation is above a specified threshold.

13. The device of claim 10, wherein the operations of executing the action corresponding to the synchronization sequence comprises waking up the device from a low-power state.

14. The device of claim 10, wherein the operations of executing the action corresponding to the synchronization sequence comprises aligning a symbol boundary based upon the at least one subset.

15. The device of claim 10, wherein the comparison result is a distance metric, and wherein the operations further comprise:
comparing a second subset of the received second set of symbols with the first set of symbols to determine a second comparison result, the second subset having the first number of symbols;
determining that the comparison result indicates a shorter distance than the second comparison result; and
wherein determining that the comparison result meets a specified condition comprises determining that the comparison result indicates a distance shorter than a specified threshold.

16. The device of claim 10, wherein at least one noise symbol is intentionally interspersed with the synchronization sequence in the second set of symbols by the second device.

17. The device of claim 10, wherein at least one noise symbol is interspersed with the synchronization sequence in the second set of symbols by the signal channel.

18. The device of claim 10, wherein the device is an Internet of Things (IoT) device.

19. A device for synchronization, the device comprising:
means for identifying a first set of symbols corresponding to a synchronization sequence, the first set of symbols having a first number of symbols;
means for receiving, over a signal channel, a second set of symbols from a second device, the second set of symbols including a second number of symbols, the second number being greater than the first number;
means for comparing at least one subset of the second set of symbols with the first set of symbols to determine a comparison result, the at least one subset having the first number of symbols, the at least one subset skipping at least one symbol that is between at least two other symbols of the second set of symbols that are included in the at least one subset;
means for determining that the comparison result meets a specified condition; and
responsive to determining that the comparison result meets the specified condition, means for executing an action corresponding to the synchronization sequence.

20. The device of claim 19, wherein the comparison result is an indication of whether there is a perfect match between the first set of symbols and the at least one subset of the received second set of symbols and wherein the means for determining that the comparison result meets a specified condition comprises means for determining that the indication is a perfect match.

* * * * *